Sept. 11, 1956  F. E. ULLERY  2,762,197
HYDRODYNAMIC TORQUE CONVERTERS
Filed July 25, 1951  5 Sheets-Sheet 1

INVENTOR.
Fred E. Ullery

INVENTOR.
Fred E. Ullery

Sept. 11, 1956 F. E. ULLERY 2,762,197
HYDRODYNAMIC TORQUE CONVERTERS
Filed July 25, 1951 5 Sheets-Sheet 3
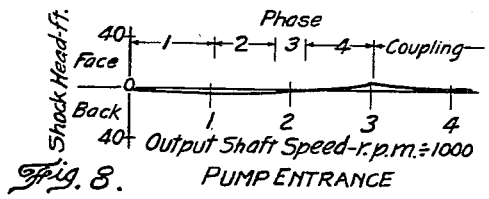
Fig. 8. PUMP ENTRANCE
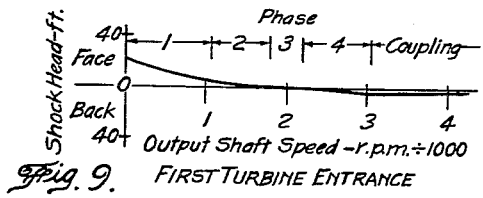
Fig. 9. FIRST TURBINE ENTRANCE
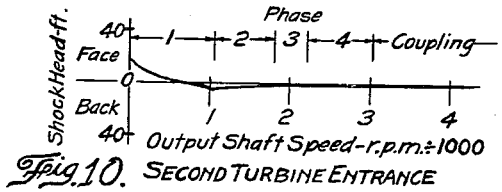
Fig. 10. SECOND TURBINE ENTRANCE
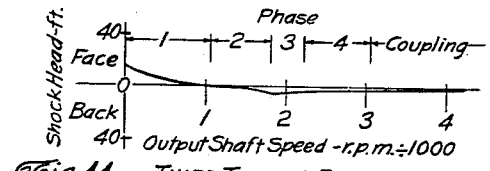
Fig. 11. THIRD TURBINE ENTRANCE
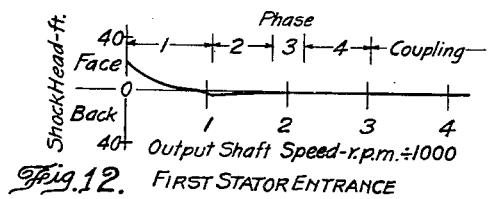
Fig. 12. FIRST STATOR ENTRANCE
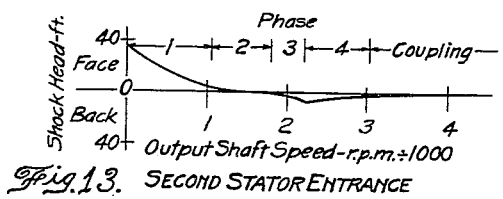
Fig. 13. SECOND STATOR ENTRANCE
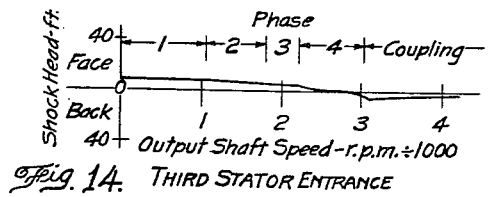
Fig. 14. THIRD STATOR ENTRANCE
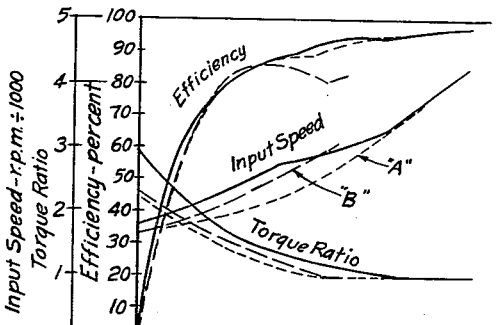
Fig. 15. Output Shaft Speed - r.p.m. ÷ 1000
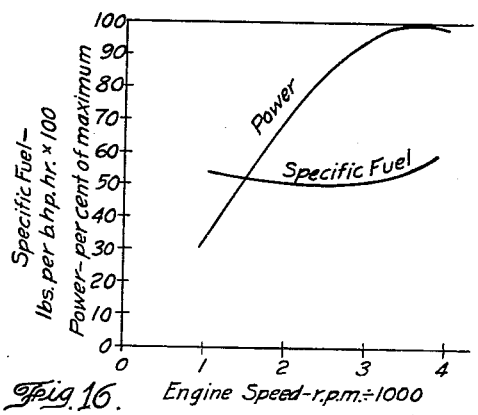
Fig. 16. Engine Speed - r.p.m. ÷ 1000
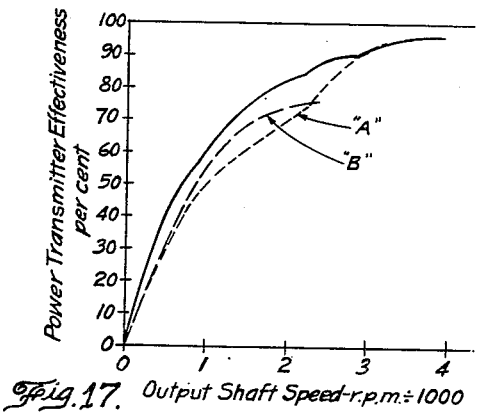
Fig. 17. Output Shaft Speed - r.p.m. ÷ 1000
INVENTOR.
Fred E. Ullery

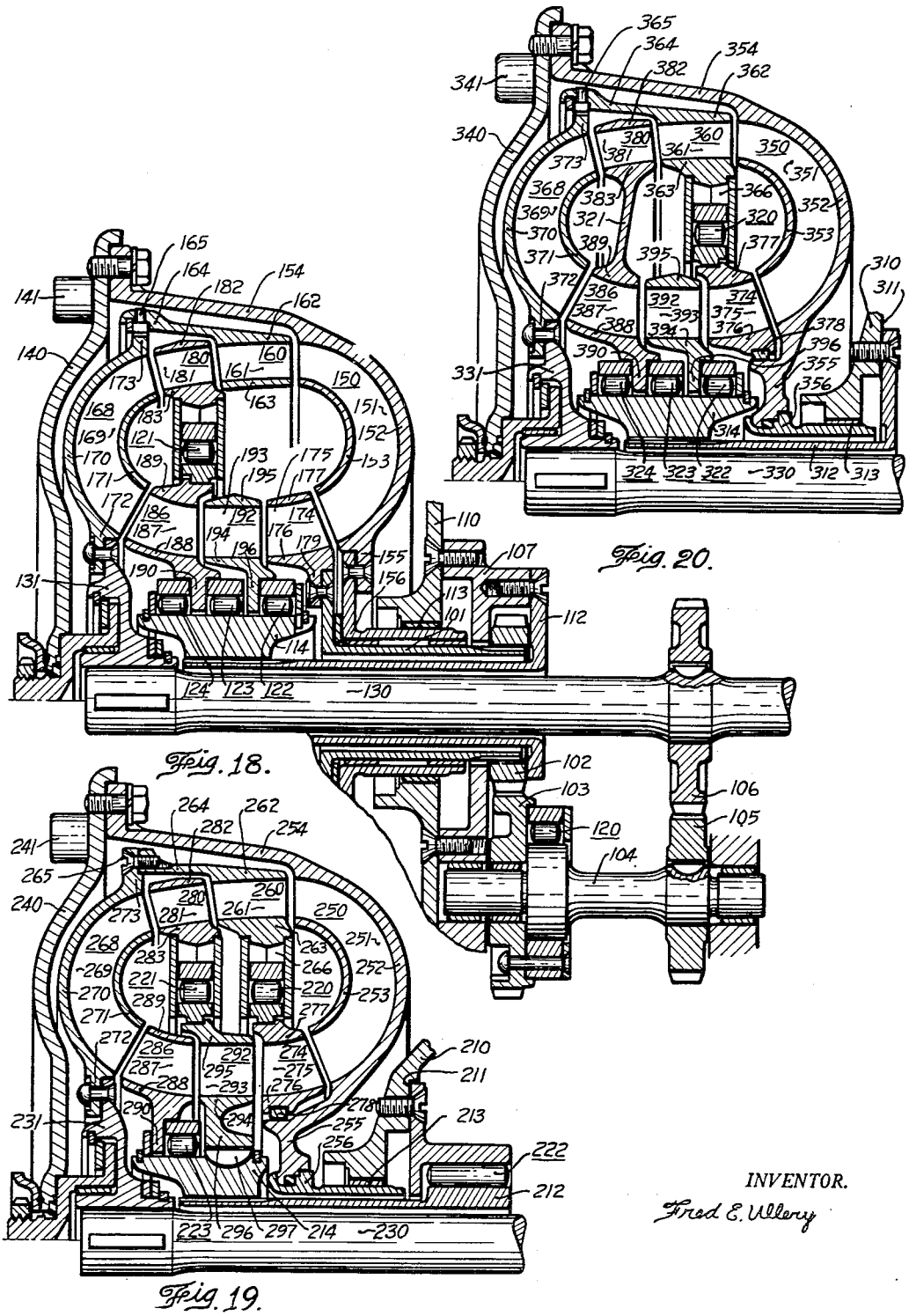

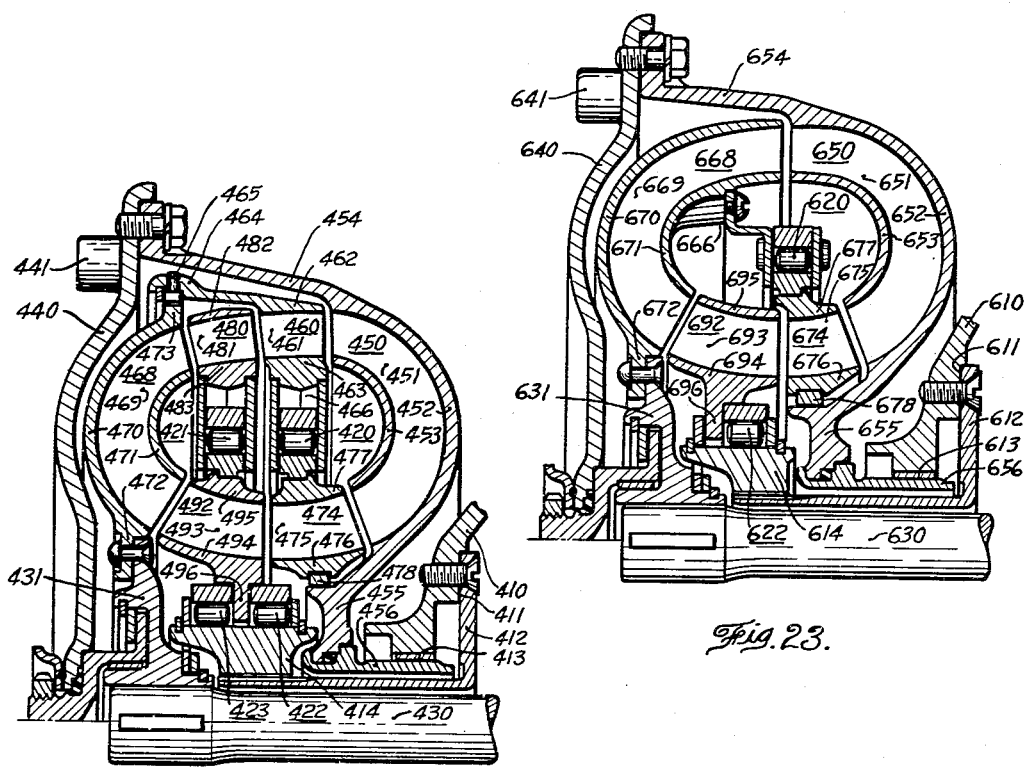
Fig. 21.
Fig. 23.
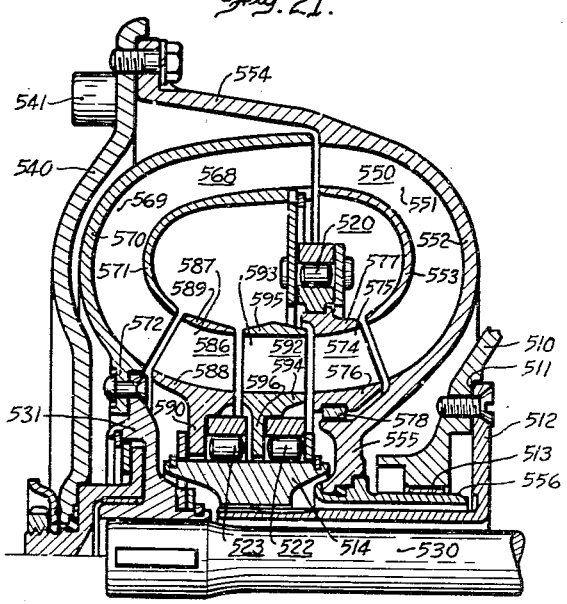
Fig. 22.
INVENTOR.
Fred E. Ullery

United States Patent Office 2,762,197
Patented Sept. 11, 1956

2,762,197

HYDRODYNAMIC TORQUE CONVERTERS

Fred E. Ullery, Detroit, Mich.

Application July 25, 1951, Serial No. 238,459

43 Claims. (Cl. 60—54)

This invention relates to improvements in hydrodynamic torque converters. These improvements are particularly important to provide more desirable and more effective hydrodynamic torque converters for automobiles. Accordingly, the various references and the particular exemplifications, herein, are for that respective usage. The advantages of this invention are, neither limited to the automotive field, nor confined to any particular type of power source; consequently, the references should not be construed as defining, or implying, any limitation on the scope of usage.

There are continuation-in-part applications relating to inventions which are at least partially disclosed herein. Those applications are as follows: Serial No. 255,167, filed November 7, 1951; Serial No. 261,702, filed December 14, 1951; Serial No. 271,550, filed February 14, 1952; Serial No. 283,090, filed April 18, 1952; and Serial No. 286,117, filed May 5, 1952.

Also, there are other applications claiming undisclosed inventions, but using a disclosed embodiment hereof as a setting. Those applications are: Serial No. 298,560, filed July 12, 1952; and Serial No. 313,471, filed October 7, 1952.

In an automobile, a hydrodynamic torque converter diminishes the exertion of the operator and renders a pleasing smoothness of the power drive. Their increasing popularity in automotive transmissions has been inspired and compelled by these advantages, in spite of a general lowering of power transmitter effectiveness and a reduction in starting ability. Starting ability is referred to herein as the torque converter stall torque ratio.

The term power transmitter effectiveness at a particular output speed of the torque converter is used to indicate, not only the torque converter efficiency, but also, the ratio of the engine power developed, to the maximum power ability of the engine. It means, the percentage of the maximum power ability of the engine available at the torque converter output shaft. In equation form:

Power transmitter effectiveness, per cent, equals $$\frac{\text{Engine power developed} \times \text{torque converter efficiency}}{\text{Maximum power ability of engine}}$$

equals $100 \times \dfrac{\text{Power transmitted by torque converter}}{\text{Maximum power ability of engine}}$ Engine power developed is for wide open throttle condition, and varies from the maximum power ability of the engine according to the speed restriction imposed on the engine by the torque converter. Obviously, for high power transmitter effectiveness, the torque converter must permit the engine to attain a speed in the region of its maximum power. This condition together with the efficiency at the coupling point defines the torque conversion speed range. Also, for high power transmitter effectiveness over a wide range of torque converter output speed, the engine must be permitted to operate over this output speed range, in the region of its maximum power.

At and near stall, a high engine speed is unacceptable for automotive passenger car usage, but a reasonably high torque ratio is quite important. Not only is a high engine speed at stall unacceptable but a low engine speed, as well as a high torque ratio, is economically desirable—each conduces a rapid rise in efficiency from stall.

Consequently, and in accordance with the general power-speed characteristics of automotive engines, the torque converter should have unusual input (engine) speed characteristics over the torque conversion range: from a reasonably low figure at stall, the input speed should rise rapidly to a speed in the region of maximum power, then the input speed should dwell or rise gradually to the coupling point; providing a wide range of torque conversion in which the power available is almost the maximum power of the engine. That is, the input speed curve from stall over the torque conversion range to the coupling point should have a humpbacked form. Hitherto, the input speed curves of automotive torque converters have had a general sagging disposition between stall and coupling point. This is a natural tendency as will be shown in a subsequent discussion.

Furthermore, automotive torque converters heretofore, have had an inadequate speed range of torque conversion; consequently, the available power in the torque conversion range has been appreciably less than the maximum power ability of the engine. As will be apparent in subsequent disclosures; a wide speed range of torque conversion, a high efficiency at the coupling point, and a high torque ratio at stall, are, by the nature of the contributing influences, conflicting features. Hitherto, these features have been compromised to avoid unacceptable inadequacy of any particular feature.

To fortify the characteristics, and to partially offset deficiencies of current torque converters, various modifications and supplementary mechanisms are so commonly adopted that they are generally considered inevitable requirements for torque converters. These arrangements are usually only partially corrective and are singularly undesirable respecting: cost, weight, proportions, complexity and operating economy and pleasantness.

For torque converter drives, the engines are usually enlarged, or otherwise altered, to increase their power. Undesirably high ratio of rear axle gears has been resorted to. Lock-up clutches with hydraulic controls are used to supplant an inefficient fluid coupling phase with a through mechanical drive. Also, some recent applications use two mechanical gear ranges with automatic controls for general driving and a third gear range for emergency purposes.

A principal object of this invention is to provide a torque converter which has a relatively low input speed at stall but through much of the torque conversion range allows the engine unusual freedom to operate in the region of high power, contributing to high effectiveness as a power transmitter.

Another important object is to provide a torque converter which has a high torque ratio at stall, a wide speed range of torque conversion, and high efficiency, further contributing to high effectiveness as a power transmitter.

A comprehensive object is to provide an automotive torque converter which is unusually effective as a power transmitter, and thus is more adequate, pleasant, and economical in operation than has been attained heretofore.

These objects as well as others will be apparent in the description and in the discussion.

In the accompanying drawings, forming a part of this specification:

Figures 1, 2, 3:
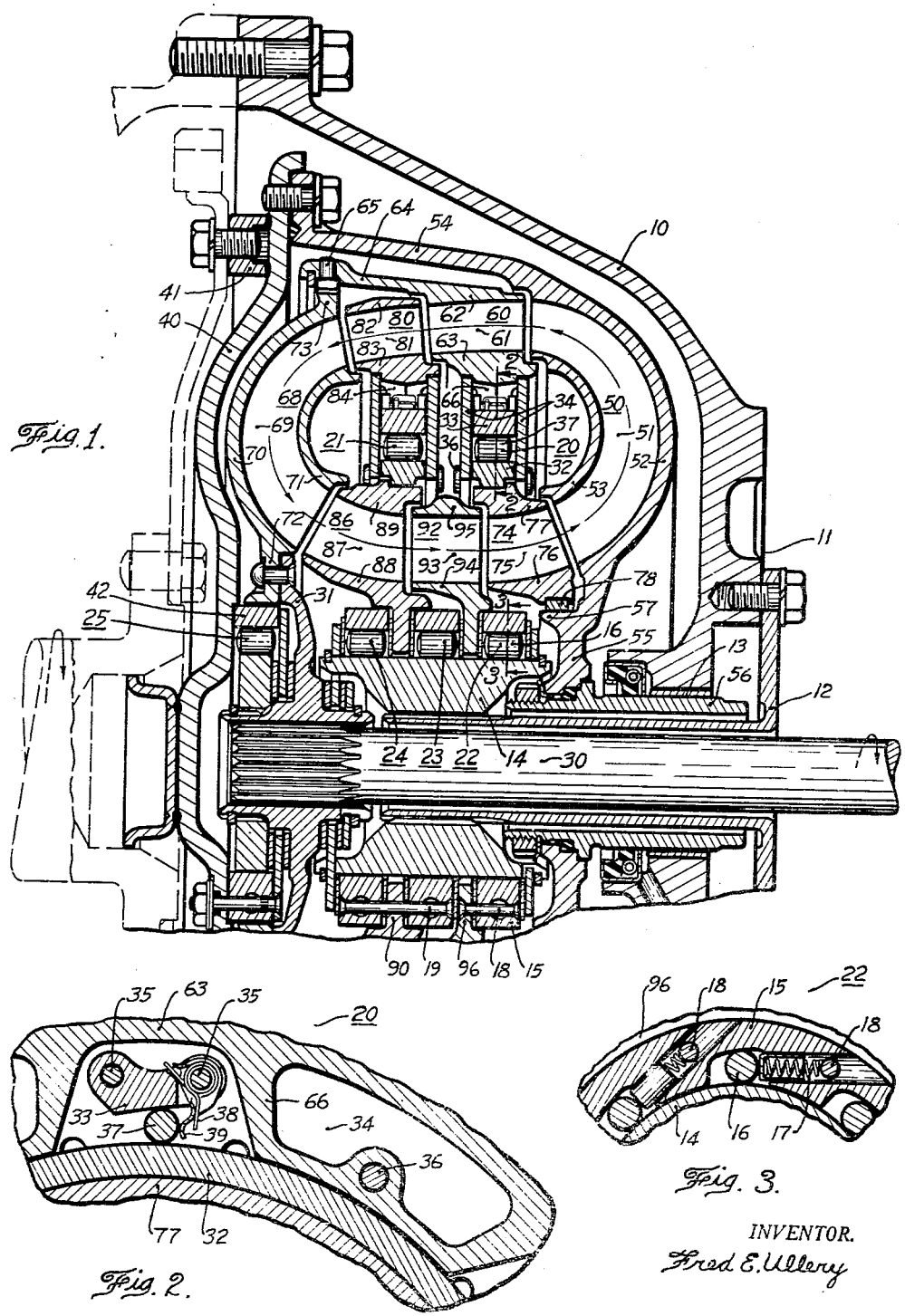
Figure 1 is somewhat more than a half section longitudinally through the axis of rotation of the preferred embodiment.
Figure 2 is an enlarged fragmentary section on line
Figure 4:
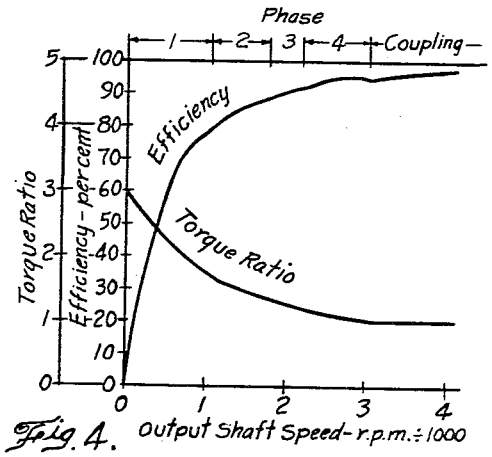
Figure 5:
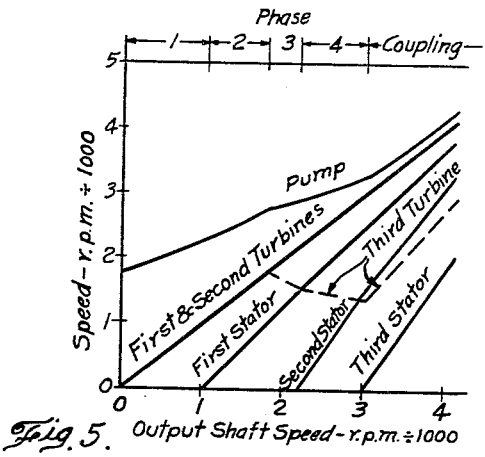
Figure 6:
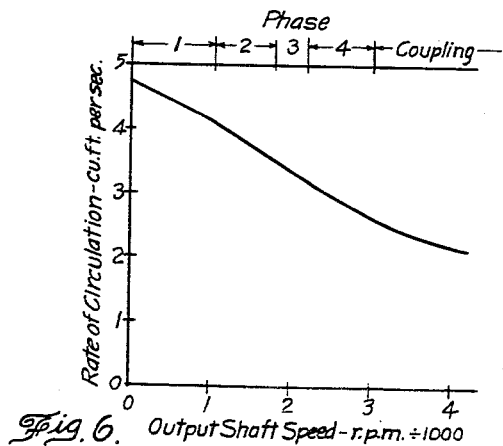
Figure 7:
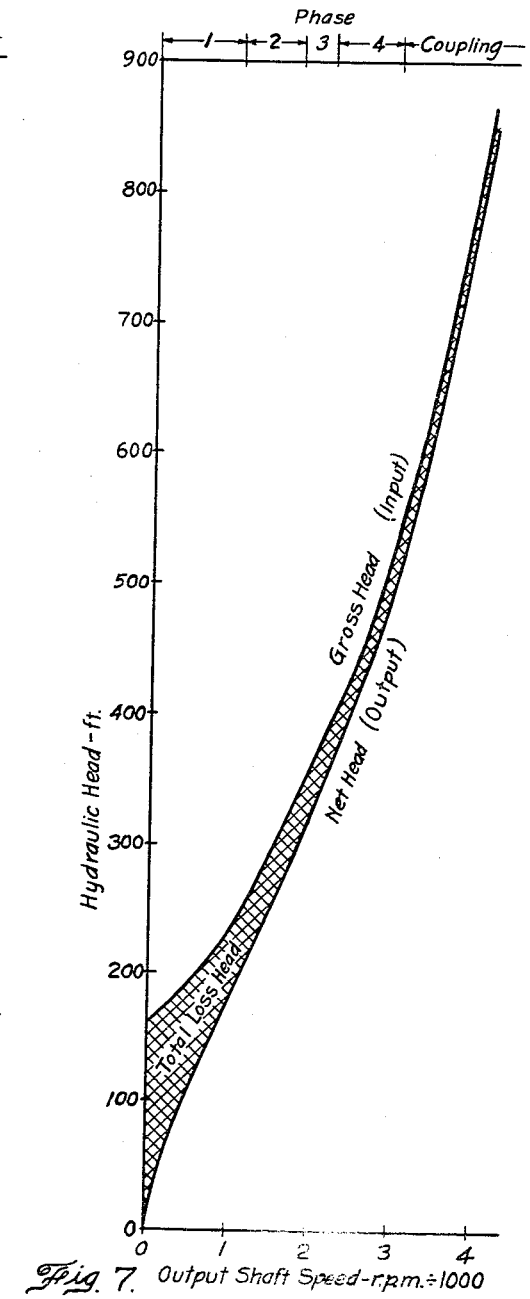

2—2 of Figure 1, showing the arrangement of the one-way devices positioned in the core cavity;

Figure 3 is an enlarged fargmentary section on line 3—3 of Figure 1, showing the arrangement of the one-way devices positioned between the fluid recirculating path and the axis of rotation;

Figure 4 is a diagram illustrative of the efficiency and torque ratio characteristics of the preferred embodiment illustrated in Figure 1;

Figure 5 is a diagram illustrative of the rotative speeds of the respective bladed members of the preferred embodiment illustrated in Figure 1;

Figure 6 is a diagram illustrative of the rate of fluid circulation in the preferred embodiment illustrated in Figure 1;

Figure 7 is a diagram illustrative of the gross head of the preferred embodiment illustrated in Figure 1;

Figures 8, 9, 10, 11, 12, 13, 14 are diagrams respectively illustrative of the shock head losses at the entrances of the bladed members; pump, first turbine, second turbine, third turbine, first stator, second stator and third stator of the embodiment illustrated in Figure 1;

Figure 15 is a diagram illustrative of the characteristics of the preferred embodiment illustrated in Figure 1 in comparison with the characteristics of two well known torque converters;

Figure 16 is a diagram illustrative of power and specific fuel characteristics of typical automotive engines;

Figure 17 is a diagram illustrative of the power transmitting effectiveness of the preferred embodiment illustrated in Figure 1, in comparison with two well known torque converters;

Figure 18 is a somewhat diagrammatic illustration of an embodiment with another form of output drive structure, but otherwise similar to the preferred embodiment of Figure 1;

Figure 19 is a somewhat diagrammatic illustration of an embodiment, with seven bladed members as illustrated in Figure 1, but with relocation of two of the one-way devices of the stator members;

Figure 20 is a somewhat diagrammatic illustration of an embodiment, with seven bladed members as illustrated in Figure 1, but with the first and second stator members conjoined;

Figure 21 is a somewhat diagrammatic illustration of an embodiment with six bladed members;

Figure 22 is a somewhat diagrammatic illustration of an embodiment with five bladed members; and, Figure 23 is a somewhat diagrammatic illustration of an embodiment with four bladed members.

Terminology and basic relationships

Before describing the specific details of this invention, it appears desirable to define some of the terms, and to establish some of the basic relationships which influence the unique characteristics obtained, thereby rendering the specification more significant and expressive of intention and purpose and reducing periodic explanations.

Except as noted, terms used herein are as recommended and with the meaning as defined per Hydrodynamic Drive Terminology, pages 738–740 of the 1951 S. A. E. Handbook, published by the Society of Automotive Engineers, Inc. Where optional terms are listed, the first is considered preferable and will be used in this specification.

As used in this specification, a hydrodynamic torque converter is a drive that transmits power by dynamic fluid action in a closed recirculating path of toroidal form, and has a fluid coupling phase as well as torque conversion phases of operation, and physically comprises: a plurality of co-axial members including at least, one pump, two turbines and one stator, with mountings to maintain axial spaced relationship, and to permit each member to rotate forwardly about the common axis in at least one phase of operation; a fluid system including an adequate fluid supply and suitable fluid control, as well as a cooling means if required; and structural components including, a stationary housing or support structure, a rotable casing with suitable seals, an input power connection, an output power shaft or structure, and a reaction torque structure.

Each member has at least one row of circumferentially spaced blades, extending across a fluid path between core and shell shroud elements, which respectively, define part of the core and shell boundaries of the fluid recirculating path. Obviously, if desired for some members, one of the shroud elements could be omitted, the blades being projected from and supported by one shroud element, and the fluid path boundary function of the omitted element provided in another manner. Each member is externally associated in accordance with its specific character, being joined by a respective attaching construction to the proper driving, driven, or reaction structure: a pump member is joined to an input power driving structure to cause forward rotation and to transmit energy to the circulating fluid; a turbine member is joined to a driven structure communicating with an output power shaft or structure, enabling it to contribute torque at least in the forward direction to the output power shaft; and, a stator member is joined to a reaction structure associated with the stationary housing, enabling it to transmit torque to the stationary housing at least in the backward direction.

The attaching construction for a member is the means of joining the member to, and is part of, its particular driving, driven, or reaction structure; it may be a mating surface, a conjunctive element, or a series of elements; and it may include a device rendering the particular member one-way acting.

Forward rotation is the direction of rotation of the pump member. All vector quantities in the forward direction are considered positive, and in the backward direction, negative.

Fluid circuit refers to the fluid recirculating path. The average radius of the fluid circuit is the average of the largest design radius and the smallest design radius of the fluid circuit. In reference to the fluid circuit, the outer half and the inner half indicate, respectively, the radially outward portion and the radially inward portion relative to the average radius of the fluid circuit. Accordingly, an outer member has the design radii of its blades larger, and an inner member has the design radii of its blades smaller than the average radius of the fluid circuit.

Rate of circulation is the volume of fluid per unit time passing a particular location, and herein is expressed, cu. ft. per sec. Being a closed path, the rate is simultaneously constant throughout the circuit.

The circulation velocity is the component of the fluid absolute velocity in a plane passing through the axis of rotation. This velocity is equal to the rate of circulation divided by the area normal to the circulation velocity.

The circumferential velocity of the fluid is the component of the fluid absolute velocity in a plane perpendicular to the axis of rotation.

The term blade angle, as used herein, refers to the effective blade angle, being the included angle between the fluid absolute velocity and a plane which passes through the axis of rotation and rotates in unison with the blades. Blade angles are considered positive and negative, respectively, for forward and backward circumferential components.

The input power head is called the gross head. In equation form, the gross head, ft. equals $$\frac{\text{Power input, ft. lbs. per sec.}}{\text{Rate of circulation} \times \text{Fluid specific weight}}$$

where rate of circulation is cu. ft. per sec., and fluid specific weight is lbs. per cu. ft. The influence of a loss head is relative to the corresponding gross head; that is, $$\text{Loss, per cent, equals } \frac{\text{Loss head, ft.}}{\text{Gross head, ft.}} \times 100$$

It is this particular combination of these factors which permits a torque converter to have a high efficiency in the coupling phase. As shown by Fig. 6, the rate of circulation in the coupling phase is low, tending to a low circulation head loss in spite of blade configurations, and at the same time, as shown by Fig. 7, the corresponding gross head is very high; consequently, the actual loss in per cent may be quite low in the coupling phase of a torque converter.

The hydraulic losses are divided into two distinct groups; namely, circulation head losses and shock head losses. The circulation head is that required to overcome the flow resistance of the passages and coincidental turbulence in accordance with the particular rate of circulation.

The shock head losses are attendant to the circumferential velocity of the fluid. Such a loss is entailed at a blade entrance which requires a sudden change in the fluid circumferential velocity. This velocity change is termed the shock velocity. The attending shock head loss, ft. equals $$\frac{\text{Constant (shock velocity, ft. per sec.)}^2}{2g}$$

The value of the constant may generally be considered unity. Actually, it varies with the blade entrance tip form, the blade spacing, and the angle of misalignment of the approaching fluid from the blade disposition. Also, it is generally larger for back impingement on the blades than it is for face impingement. Herein, the shock head for face impingement is called face shock head, and for back impingement, back shock head.

The curves of Figs. 4—14 incl. are based on an input torque simulating the wide open throttle torque of a particular engine. Comparable curves for partial throttle conditions may be constructed by applying the basic torque converter relationships:

Pump torque plus stator torque equals turbine torque.
Speed ratio × torque ratio × 100 equals efficiency, per cent.

At any specific speed ratio:
Pump torque and the hydraulic heads vary directly as the second power of the pump speed.
Fluid circulation varies directly as the pump speed.

Hence, if the pump torque is reduced to one-fourth of its original torque and the speed ratio of the output speed to the input speed is maintained: the pump speed and that of all other members will be reduced to one-half, all members retaining their original speed ratios; the rate of fluid circulation is also reduced to one-half; and, all the torques and the hydraulic heads are reduced to one-fourth of their respective original values. Thus, if the particular speed ratio exemplified was that of the coupling point, the torque conversion range would be reduced to one-half of its original speed range. This is presented to emphasize that phase changes, some of which are pertinent to this invention, concur with respective speed ratios and not according to specific output speeds.

A one-way device is the term used in this specification for a mechanism in the connecting structure of a bladed member to enable the particular member to transmit torque to its respective external association but only in a specific direction, the one-way device permitting free rotation in the opposite direction. Figs. 2 and 3 illustrate suitable one-way devices for the embodiments of this specification. With one exception, each stator member of these embodiments is, in effect, provided with a one-way device and may transmit torque to the stationary housing in the backward direction, but, for the single exception noted, each may rotate forwardly when it would otherwise exert torque in the forward direction.

One specific turbine member in each of the embodiments illustrated in this specification has a one-way device in its connecting structure to the torque converter output shaft, enabling the member to transmit torque to the ouput shaft in the forward direction and permitting relative rotation in the opposite direction when it would otherwise exert backward torque on the output shaft.

Considering the moment of momentum of the circulating fluid vectorially positive in the forward direction, and negative in the backward direction; a stator member with a one-way device can increase, but can not reduce, the moment of momentum; and a turbine member with a one-way device can reduce, but can not increase, the moment of momentum of the circulating fluid.

Actually, there is a slight influence counter to the direction of relative rotation due to friction in the one-way device and in the rotational mounting of the member, some of which may be intentional to damp rotational hunting and fluctuation of the member.

Free-whirling is the term used herein to distinctly indicate the state of free rotation of a member by virtue of a one-way device in the connecting structure of the particular member.

As previously stated, a free-whirling member does not appreciably change the moment of momentum of the circulating fluid, and hence, free-whirling is a non-functional phase of operation for the particular member. However, a free-whirling member may have other influences which are very detrimental hydraulically, in respect to circulation and shock head losses. It is apparent that a free-whirling member adds to the circulation head loss according to the flow resistance of its bladed passages; however, this loss is not appreciable in the late phases of operation when the rate of fluid circulation is relatively low.

The most serious influence of a free-whirling member, generally, is its respective shock head loss. The nature of this loss is dependent on the form of the particular member relative to the physical environment. Fortunately, with due consideration of the pertinent factors, the shock loss may be appreciably reduced and substantially eliminated in some phases. Control of these losses is a vital factor in obtaining high efficiency to augment power transmitter effectiveness, with which this invention is objectively concerned. Hence, the derivation of the expression showing respective influences is presented. Let $A$=effective flow area, sq. ft. (area normal to circulation velocity).
$R$=design radius, ft.
$B$=blade angle.
$Q$=rate of circulation, cu. ft. per sec.
$\rho$=density of fluid, slugs per cu. ft.
$N$=rotational speed, R. P. S., of free-whirling member.
$Vcr$=fluid circumferential velocity, ft. per sec., prior to blade entrance.

And suffixes, $n$ and $x$, respectively, indicate at entrance, and at exit.

And, equate the moment of momentum prior to blade entrance to that at blade exit, $$Q \cdot \rho \cdot Vcr \cdot Rn = Q \cdot \rho \left(2\pi N Rx + \frac{Q}{Ax} \tan Bx\right) Rx$$

whence $$2\pi N Rx + \frac{Q}{Ax} \tan Bx = Vcr \frac{Rn}{Rx}$$

which is the free vortex law stating that the circumferential velocity is inversely proportional to the radius.
From Equation $a$, $$N = \frac{1}{2\pi Rx}\left(Vcr \frac{Rn}{Rx} - \frac{Q}{Ax} \tan Bx\right) \quad (b)$$

and, the fluid circumferential velocity immediately after entrance in the bladed passages, equals $$\frac{Rn}{Rx}\left(Vcr \frac{Rn}{Rx} - \frac{Q}{Ax} \tan Bx\right) + \frac{Q}{An} \tan Bn \quad (c)$$

The difference of this velocity from $V_{cr}$ is the shock velocity, and is $$V_{cr}\left[1 - \left(\frac{Rn}{Rx}\right)^2\right] - \left[\frac{Q}{An} \tan Bn - \frac{Rn}{Rx}\frac{Q}{Ax} \tan Bx\right] \quad (d)$$

The second power of this expression divided by 2 g gives approximately the shock head loss in ft.

Equation d shows the proportions of radii and passage areas of a member required to eliminate the shock head loss for a particular circumferential velocity at entrance. The physical significance is simple—the absolute velocity of the fluid is directionally varied to conform generally to the blade effective curvature, by the influence of circulation path area variation, and/or, by the free vortex effect of change of radius.

It has been stated that a free-whirling member does not appreciably change the moment of momentum of the circulating fluid. This is true concerning the total effect, but normally, there is an intervening fluctuation. With the change in circumferential velocity (shock velocity) at the blade entrance, there is a corresponding change in the moment of momentum which imparts an impulse drive to the blades. As the fluid passes through to the blade exit, there is a counterbalancing reaction drive on the blades, restoring the moment of momentum of the circulating fluid.

Characteristically, the free-whirling state of a member starts after an appreciable angle of back impingement has developed. Subsequently, this impingement may actually veer to the face side of the blades by virtue of relationships shown in Equation d.

Specific basic relationships and influences will be disclosed in a subsequent discussion of the features of the preferred embodiment.

*Description*

The embodiment of this invention illustrated in Figure 1, is considered the preferred—it gives physical exemplification to the basic concepts of this invention and adequately achieves the comprehensive objective. Also, a thorough description and explanation of this embodiment serves to make the features and characteristics of the simpler embodiments apparent with only brief specific comments.

It is intended for this particular automotive application, that the torque converter should be supplemented with a simple mechanical transmission at the output shaft end. This transmission should have a reverse gear and a low ratio forward gear, the latter, for unusual conditions, such as, prolonged and steep uphill driving or sustained downhill operation requiring abnormal engine braking. The hydraulic system of this transmission serves the torque converter with an adequate supply of fluid and provides the charging and the replenishing means and controls.

Referring to Figure 1, a stationary housing 10 bolted to the rear end of the engine, encloses the torque converter, and has a rear face 11 which in this illustration serves as an attachment surface for the supplementary transmission, as well as for the flanged reaction shaft 12 bolted thereto. This is mechanically equivalent to the generally desirable and customary arrangement in which the reaction shaft is secured to a stationary portion of the supplementary transmission, and which, in effect, serves as part of the reaction structure.

The torque converter cover 40 encloses the torque converter fluid chamber and serves as part of the pump driving structure from the engine. This cover has a series of circumferentially spaced knobs 41. Screws through the web of the engine fly-wheel, and threaded into these knobs, provide the torque converter driving connection.

An output shaft 30 transmits the torque converter output power to the supplementary transmission.

The bladed members, in the order of arrangement of their blades in the fluid recirculating path in the direction of fluid circulation, and starting at the pump entrance, are: the pump member 50, the first turbine member 60, the first stator member 80, the second turbine member 68, the second stator member 86, the third stator member 92, and the third turbine member 74.

The pump member 50 has a series of blades 51 across a fluid path bounded by shell 52 and core 53. The driving connection for the pump member is a skirt-like element 54 near the pump exit extending from the pump shell to the torque converter cover 40 to which it is fastened with screws. Near the pump entrance, and extending inwardly from the pump shell, is a hub element 55 to which is secured a sleeve 56 which is journaled at 13 in stationary housing 10. The pump shell 52, the driving element 54, and the hub element 55, form part of the torque converter fluid casing for this particular embodiment.

The turbine members are described in the order of their physical connection to the output shaft—the members being arranged structurally in series relationship from a single connection to the output shaft.

The second turbine member 68 has a series of blades 69 across the fluid path bounded by shell 70 and core 71. Near the exit of the second turbine member, and extending inwardly from the shell, is a driven hub structure consisting of, a hub 31 splined to the output shaft 30 and riveted to a flange element 72 associated with shell 70. This element 72 also serves as a rotational mounting on race 42. Near the entrance of the second turbine member, projecting outwardly, is a rim element 73.

The first turbine member 60 has a series of blades 61 across the fluid path bounded by shell 62 and core 63. A driven skirt-like element 64 extends from the shell and mates with rim element 73 of the second turbine member. At the mating junction, a driving connection is provided which consists of square-head pins 65 pressed in drilled holes in element 64 and registering with milled notches in rim element 73. The first turbine core has a driving element 66, illustrated in Figure 2, as a truss-like structure integral with the core 63.

The third turbine member 74 has a series of blades 75 across the fluid path bounded by shell 76 and core 77. A portion of the shell is formed to retain a bearing bushing 78 which is journaled by rim 57 protruding from the pump member hub element 55; thus insuring rotational concentricity of the third turbine member. A one-way device 20 (described in the following paragraph) is interposed between the third turbine core 77 and the driving element 66 associated with the first turbine core. This one-way device prevents forward rotation, but permits backward rotation, of the third turbine member relative to the first turbine member and enables the third turbine member to contribute torque through its driven structure to the torque converter output shaft, but only in the forward direction. As has been described, the driven structure for the third turbine member is a series of structural elements, including the structures of the first and second turbine members.

Figure 2 illustrates one suitable arrangement and construction for one-way device 20. For this particular situation, the race 32 is the driving element of the device. This race is serrated on its inner surface and is shrunk on the third turbine core 77. The driven element consists of two annular discs 34, between which, a plurality of cams 33 are secured in a radially outward position relative to the race by pins 35. The annular discs in turn are secured by rivets 36 to the driving element 66 associated with the first turbine core. The wedging rollers 37 are urged and guided in wedging position between the cams and the race by arms 39 actuated by springs 38.

The stator members are somewhat in series structurally, and will be described in order of respective physical proximity to the hollow reaction shaft 12.

The third stator member 92 has a row of blades 93 across the fluid path bounded by shell 94 and core 95.

Associated with the shell, is an element 96 which serves as an attachment flange for a one-way device 22 interposed between the third stator member and the reaction shaft 12. This construction prevents backward rotation, but permits forward rotation of the third stator member relative to the reaction shaft, and enables the third stator member to transmit torque through the reaction structure to the stationary housing 10, but only in the backward direction.

Figure 3 illustrates one suitable arrangement and construction for one-way device 22. An inner race 14, concentric with the axis of rotation, is spline connected to reaction shaft 12. A cam element 15, which is a thick wall race with a plurality of cam surfaces internally, is fastened by rivets 18 to shell flange 96. Wedging rollers 16 are urged in wedging position, between the inner race and the cam surfaces, by springs 17.

The second stator member 86 has a series of blades 87 across the fluid path bounded by shell 88 and core 89. Interposed between the second stator member and the reaction shaft 12 are one-way devices 23 and 24, the cam elements of which are attached with rivets 19 to flange element 90 associated with the second stator shell. The arrangement and construction of each of these one-way devices is the same as that illustrated in Figure 3 for one-way device 22. Two are used to provide adequate capacity and for interchangeability of parts—obviously a single one-way device with adequate capacity may be used. As described, the construction prevents backward rotation but permits forward rotation of the second stator member relative to the reaction shaft, and enables the second stator member to transmit torque through the reaction structure to the stationary housing 10, but only in the backward direction.

The first stator member 80 has a series of blades 81 across the fluid path bounded by shell 82 and core 83. An element 84 associated with the core provides a connection for the one-way device 21 interposed between the first stator core 83 and the second stator core 89. The arrangement and construction of this one-way device is the same as that for one-way device 20 illustrated in Figure 2. The arrangement prevents backward rotation but permits forward rotation of the first stator member relative to the second stator member, and enables the first stator member to transmit torque through the second stator member and the reaction structure to the stationary housing 10, but only in the backward direction.

Also shown in Figure 1, is a one-way device 25 interposed between the output shaft 30 and the torque converter cover 40. The construction and arrangement is the same as illustrated for one-way device 22 in Figure 3. This one-way device may be termed an anti-coast device. It is used to prevent forward over-run of the output shaft relative to the engine—it provides more engine braking for downhill coasting, and aids push-starting of the engine. These comments are included to complete the description of the illustration. The anti-coast device is not pertinent to this specification—its inclusion in a drive is optional, and generally complementary. In Figures 18 to 23 inclusive, this anti-coast device is omitted.

The bladed members illustrated are formed by casting; however, they may be cast, fabricated, or otherwise made, of any suitable materials without departing from the intent of this specification.

Some of the specific requirements dominating blade angles will be disclosed in a subsequent discussion. Intrinsically, turbine member blades are curved to vectorially reduce, and stator member blades are counter curved to vectorially increase, the moment of momentum of the circulating fluid. However, this specification is not limited to any particular blade form, blade tip form, blade spacing, or necessarily to a single row of blades in any member.

Operation

The basic principle of operation is typical of hydrodynamic torque converters. Mechanical energy is simultaneously transmitted to and extracted from a fluid circulating in a closed path, in which: pump blades transmit energy to the fluid; turbine blades extract energy from the fluid; and intervening stator blades react and transform the physical properties of the fluid. The objective is, increased flexibility of the torque and speed properties of the available power in accordance with the needs of the particular application—in this instance, an automotive drive. It may be noted throughout this specification that: torque ratio and speed ratio characteristics are dominated by the nature of the bladed members; and, efficiency is dependent on specific control and blending of factors attending the hydraulic losses.

The curves shown in Figures 4–14 incl., graphically indicate the operation and characteristics of the embodiment illustrated in Figure 1. As shown in Figure 4, this embodiment has a high torque ratio at stall and a wide speed range of torque conversion. Also, the efficiency is quite high over a large portion of the torque conversion range and throughout the coupling phase of operation.

Figure 5 discloses the rotative speeds of the various members. This is particularly indicative of the mode of operation in showing the respective status of each member. It may be noted that the differential speeds between the first and third turbine members, and between the first and second stator members, are relatively low—accordingly, the sliding velocities are not excessive between the elements of the one-way devices in those respective locations, in spite of acting at a relative large radius.

The rate of fluid circulation of Figure 6 has the typical trend for a torque converter with torque conversion and coupling phases of operation. To enable the members to develop high torques at stall, the rate must obviously be high; to attain high efficiency in the vicinity of the coupling point, the rate must be low, as previously discussed.

The gross head curve of Figure 7 was previously explained. It is the gross head to which the various loss heads are relative in the determination of efficiency.

Figures 8 to 14 incl. illustrate the shock head losses at the entrance to the blades of the respective members. These curves help to indicate the fluid directional changes through the various phases of operation—face and back shock, respectively indicating face and back impingement of the fluid on the blades.

From stall through the 1st phase, the embodiment illustrated in Figure 1, operates as a three-stage torque converter, all the members being functional in the 1st phase. Most of the shock head losses are characteristically high. That of the first turbine member, Figure 9, tends to be self-compensating for all phases of operation—the circumferential velocity components of the adjoining blades vary in accordance with the rate of circulation and tend to offset the physical velocity differential of the adjacent members. As shown in the coupling phase, there is a slight back shock head at the first turbine blade entrance. When justified, a one-way device could be interposed between the first and second turbine members. In this particular embodiment, it would only function for a high speed and low torque situation.

The 2nd phase of operation starts when the first stator member starts free-whirling in response to the increasingly high circumferential velocity of the fluid discharged from the first turbine member. Thus, in this phase, the operation is functionally that of a two-stage torque converter. The first stator member is constructed with regard to Equation d—accordingly and as indicated in Figure 12, the shock head loss is reduced and becomes insignificant in the subsequent coupling phase. Comparable consideration was given to the shock head loss at the entrance to the second turbine blades, as illustrated in Figure 10. After the first stator member free-whirls, the circumferential velocity of the fluid entering the second turbine member is dominated by the exit of the first turbine member. The blade angles of these members are arranged with regard to free vortex law, Equation a—thus, the shock head loss at the second turbine entrance is reduced, so that it also becomes insignificant in the coupling phase.

The 3rd phase of operation starts when the third turbine member free-whirls. In this phase, and also in the 4th phase, the operation is that of a single-stage torque converter.

Throughout the torque conversion range which includes 1st to 4th phases incl., the fluid is discharged to the third turbine member by the third stator member, the blades of which have a strong positive exit angle. Hence, the fluid has a forward circumferential velocity which is very high at stall and decreases to a low value at the coupling point, being proportional to the rate of circulation. The variation in the fluid moment of momentum is considerably greater, being proportional to the second power of the rate of circulation.

The blades of the third turbine member are curved to reduce the fluid circumferential velocity, having an appreciable entrance angle of positive character, and for this particular design, an exit angle which is approximately zero. In the 1st and 2nd phases, the blades reduce the moment of momentum, the change being transmitted to the output shaft as torque. From stall, this influence declines: the blade circumferential velocity increases proportionally to the increasing rotative speed of the output shaft; and as previously mentioned, the circumferential velocity of the fluid from the third stator exit simultaneously declines. When the moment of momentum of the fluid leaving the third turbine member is equal to that of the fluid discharged from the third stator exit, the third turbine member free-whirls, and rotationally lags behind the output shaft. In fact, as illustrated in Figure 5, its speed in the 3rd and 4th phases declines in conformity with the declining circumferential velocity of the fluid from the third stator exit; however, in the coupling phase its speed again increases in response to the increasing circumferential velocity of the fluid as then dominated by the second turbine member.

The shock head loss at the entrance to the third turbine member is illustrated in Figure 11. The influence of its exit design radius is larger than its entrance design radius as will be disclosed in the subsequent discussion.

Figure 8 illustrates the shock head loss at the entrance to the pump member blades. The action of the third turbine member is a vital factor in curtailing the usual extreme range of shock velocity at the pump entrance. The circumferential velocity of the fluid entering the pump member is successively dominated: by the third turbine member in the 1st and 2nd phases; by the third stator member in the 3rd and 4th phases; and, by the second turbine member in the coupling phase. The influence of the third turbine member permits a pump blade entrance angle of appreciable negative character, which is essential to keep the shock head losses low in the 3rd, 4th and coupling phases.

The 4th phase begins when the second stator member free-whirls. The shock head loss at the blade entrance of the second stator member is illustrated in Figure 13. The circumferential velocity of the fluid entering this member is dominated by the second turbine member for all phases of operation. The exit blade angle of the second turbine member is a large angle of negative character. The second stator blades are curved from a medium size entrance angle of negative character to an exit angle which is approximately zero. The shock head losses of this member are curtailed by the influence of change in radius indicated in Equation d.

The coupling phase commences when the third stator member free-whirls. Figure 14 illustrates the shock head loss at the blade entrance of this third stator member. The circumferential velocity of the fluid entering this member is dominated by the second stator member in the 1st, 2nd, and 3rd phases; and, by the second turbine member in the 4th, and the coupling phases. The third stator blades curve from a medium size positive angle at entrance to a large positive angle at exit.

In the coupling phase, the pump member and the first and second turbine members are the only members that appreciably influence the moment of momentum of the circulating fluid. Actually, the first and second turbine members perform like a single turbine member, receiving fluid from the pump exit and discharging it to the pump entrance.

This invention is not limited to the free-whirling sequence described, namely: the first stator member, the third turbine member, the second stator member, and finally, the third stator member. By modifications of blade angles, design radii and fluid path areas, the sequence may be changed: the free-whirling of the third turbine member may start earlier than that of the first stator member, or later than that of the second stator member; also, the first and second stator members may be characterized to independently free-whirl at, or about, the same time.

Discussion

In a hydrodynamic torque converter, the various members act and coact as a combination to achieve the particular characteristics of torque ratio, speed ratio, efficiency and power transmitter effectiveness. The rate of circulation of the fluid at any particular output speed is dependent on the cumulative influences of all the members; and the reactions of the members in turn are dependent on the rate of fluid circulation. Although a particular member may be non-functional in a specific phase, it usually is an important contributing factor aiding the desirable torque converter characteristics achieved in that specific phase—by its action and influence in other phases, the other members are permitted to have physical features which are conducive to the desirable characteristics achieved in the specific phase.

In the preceding explanation of the operation of the embodiment illustrated in Figure 1, the avoidance of shock head losses was emphasized. The fact that a particular reduction in shock head loss improves efficiency may be conceded, but the manner in which this improvement in efficiency is obtained is rather involved, and is typical of the actions and reactions in this class of torque converters. Consider these influences at a specific output speed. Part of the shock head saving is allocated to circulation head to increase the rate of circulation. Accordingly, the pump speed is reduced giving a higher speed ratio, and accordingly, a higher efficiency. If the specific output speed is in the torque conversion range, the increased rate of circulation increases the torque ratio, which also contributes to a higher efficiency. The physical size of the torque converter is also affected—if the relationship of the torque converter to the engine is maintained, the torque converter must be revised relative to size and blade angles, particularly the blade angle at the pump exit.

In the following discussion, the significant relationships of some of the unusual features of the various members will be disclosed. First, the requirements at stall and at the coupling point will be disclosed; then, the internal and intervening features and influences will be revealed and discussed; and finally, the results of the combined influences and coactions will be compiled, showing relative superiority of power transmitter effectiveness.

The engine speed at, and in the proximity of stall, could be low if considered only for the torque converter output power demand. A low engine speed and a high torque ratio conduce a rapid rise in efficiency from stall. A high stall speed has a tendency to increase the torque ratio, but is an inefficient means of augmenting that property. The general automotive policy is to use a stall speed high enough to keep within reason the creep tendency of an idling engine—thus, permitting the omission of the mechanical clutch. This invention is not restricted to applications without clutches, but the stall speed of the embodiment illustrated in Figure 1 conforms to that customary automotive practice. Inasmuch as this torque converter has a higher stall torque ratio than known automotive torque converters, the stall speed selected is also slighter higher, to limit the creep to a comparable tendency.

The engine speed at the coupling point should be in the vicinity of maximum power of the engine; if appreciably below this speed, the power available in the torque conversion range will be accordingly curtailed. Generally, it appears desirable to have the coupling point just below that of maximum power—this favors torque converter efficiency and engine fuel economy. Figure 16 illustrates the average characteristics of four recent automotive engines. From these it appears that the coupling point engine speed should be approximately 3000–3200 R. P. M. It is not unreasonable to expect a coupling point efficiency of 92–95 per cent; hence, the coupling point output speed is 2800–3000 R. P. M., which gives a torque conversion range much greater than that of known automotive torque converters.

Previously, it was shown that the third turbine member avoids high shock losses at the pump entrance, by dominating the circumferential velocity of the fluid entering the pump in the 1st and 2nd phases. This third turbine member has an exit design radius larger than its entrance design radius. One reason being, to avoid high shock losses at entrance to its blades when it is free-whirling. This may be shown by application of Equation $d$. For this demonstration, let suffixes $s$, $sx$, $t$, $tn$ and $ex$ indicate, respectively, third stator member, third stator exit, third turbine member, third turbine entrance and third turbine exit. Hence, shock velocity, equals $$\left(2\pi NsRsx + \frac{Q}{Asx} \tan Bsx\right)\left[1 - \left(\frac{Rtn}{Rtx}\right)^2\right] - \left[\frac{Q}{Atn} \tan Btn - \frac{Rtn}{Rtx}\frac{Q}{Atx} \tan Btx\right]$$

Assume that the design radius of the third turbine member is constant, then the first half of the equation is zero, and the shock velocity is the differential of the entrance and exit blade components of circumferential velocity. Also, as previously stated, the blade exit angle is approximately zero. When the exit design radius is larger than the entrance design radius, the first half of the equation becomes significant, and reduces the shock velocity approximately by its value.

In the 3rd and 4th phases, the circumferential velocity of the fluid entering the pump member is dominated by the third stator member. To avoid high shock head losses at the pump entrance in these phases, a medium-size negative blade angle at the pump entrance is required.

In the coupling phase, the circumferential velocity of the fluid entering the pump member is dominated by the second turbine member. To curtail the shock head loss in this phase, it is advantageous to have the exit design radius of the second turbine member larger than the entrance design radius of the pump member. This may be made apparent by the physical conditions. Assume that these radii are equal—the rotative speed of the second turbine member is, intrinsically, lower than that of the pump member, and the second turbine exit blade angle is larger negatively, than the pump blade entrance angle; hence, the circumferential velocity of the fluid discharged from the second turbine member is appreciably lower than that after entrance in the pump blades, causing a high face shock head loss. By a larger radius at the exit of the second turbine member, the circumferential velocity of the fluid discharged is consequently increased. Also, as the fluid flows to a smaller radius at the pump entrance, the circumferential velocity is further increased in accordance with the free-vortex law as expressed by Equation $a$.

In the preceding paragraph, it was shown desirable to have in effect a radial outward trend of the fluid passages of the third turbine member, and inasmuch as fluid is discharged directly to the pump member, the exit design radius of the third turbine member must not be larger than the pump entrance design radius. Hence, the exit design radius relationship of the second and third turbine members may be stated—the exit design radius of the second turbine member should be larger than that of the third member.

The first stator member, by virtue of its location in the outer half of the fluid recirculation path, directly improves torque ratio near stall, and indirectly permits high efficiency in the vicinity of the coupling point, even with a wide speed range of torque conversion.

The large design radius of the first stator member enables it to develop high reaction torque with a reasonable rate of fluid circulation, but its large radius correspondingly restricts its direct functional speed range. A unique feature of this member is its form, which conforms to the relationships of Equation $d$, and thus avoids appreciable shock head losses in the subsequent free-whirling phases. One favorable influence of this member is indirect, but nevertheless, it is very important—it relieves the other stator members, positioned in the inner half of the fluid recirculating path, of extreme reaction torque demands near stall, for which they are physically at a disadvantage; thus, permitting these members to be featured for high efficiency in the vicinity of the coupling point. These particular features may be definitely shown by the free-whirling relationship of the third stator member to the second turbine member in the coupling phase. In an equation of the free-vortex relationship, similar to Equation $a$, let suffixes $t$, $tx$, $s$ and $sx$, respectively indicate the second turbine member, second turbine exit, the third stator member and third stator exit, then $$2\pi NsRsx + \frac{Q}{Asx} \tan Bsx = \frac{Rtx}{Rsx}\left(2\pi NtRtx + \frac{Q}{Atx} \tan Btx\right)$$

Solve for $Nt$ at the coupling point, where $Ns=0$ $$Nt = \frac{Q}{2\pi Rtx}\left[\frac{Rsx \tan Bsx}{Rtx} - \frac{\tan Btx}{Atx}\right]$$

In satisfying these requirements, it is known that the rate of circulation must be reasonably low to avoid excessive circulation head loss and also to retain a high gross head. As previously stated, the blade exit angles of the second turbine member and of the third stator member are made as large as practical—the limitations being: the passage choking effect of large blade angles, and the correspondingly high fluid velocity relative to blade surfaces; large shock angles at the entrances to the second stator and the third stator blades; and, objectionable warp and contortion of blades. The exit radius of the second turbine member is made as low as practical with consideration of, space requirements for the inner connecting structures and drive devices, and the shock velocity conditions to the second stator member and to the pump member. The remaining factor is that of passage areas. The influence of the first stator relieving the extreme conditions near stall, permits these areas to be unusually small, and thus promotes high efficiency in the vicinity of the coupling point.

The most novel and one of the important contributions of the third turbine member to power transmitter effectiveness, is its influence on the pump member speed curve. It is the novel influence of the third turbine member which gives the humpbacked form to the pump member speed curve in the torque conversion range as illustrated in Figure 5, and thus grants the engine unusual freedom to develop power through the torque conversion range—the pump member speed being the torque converter input speed and equal to the engine speed.

This unique pump member speed characteristic is obtained by reversing the trend of the moment of momentum of the fluid entering the pump—from stall through the 1st and 2nd phases, the fluid is discharged to the pump entrance by the third turbine member which rotates in unison with the output shaft; thus, the moment of momentum of the fluid discharged to the pump entrance has an increasing trend which causes the speed of the pump member to rise unusually rapid; through the 3rd and 4th phases, the third turbine member is free-whirling, the fluid enters the pump member as dominated by the stationary third stator member; consequently, the moment of momentum of the fluid discharged to the pump entrance has a decreasing trend, being proportional to the second power of the declining rate of fluid circulation, which trend has a restraining influence on the speed of the pump member. These reversing influences and trends are superimposed on the general trend of the pump member speed to rise with the declining rate of fluid circulation, causing the hump-backed speed curve. The influence of the third turbine member on the speed of the pump member is intensified and hastened by the exit design radius of the third turbine member being larger than that of the third stator member; which is physically equivalent to stating, by the exit design radius of the third turbine member being larger than its entrance design radius.

In contrast, the input speed curves of known automotive torque converters have a sagging tendency between the stall speed and the coupling point speed. From the basic equation that pump torque is equal to the change in the moment of momentum of the circulating fluid, the pump speed expressions may be derived. These expressions indicate the sagging nature.

For a torque converter in which the final stator member discharges the fluid directly to one, or more pump members in series relationship, the pump speed equation is, $$\text{Pump speed} = \frac{C_1}{Q} + C_2 Q$$

where $Q$ is the rate of fluid circulation, and $C_1$ and $C_2$ are constants according to: the radii, the blade angles, and the passage areas at the exits of the particular stator and pump members, and the pump input torque; which, in the particular torque converter environment, gives a speed curve extending from the specific stall speed to the specific coupling point speed. For a typical rate of circulation curve, it is obvious that there will be an appreciable sagging tendency of the speed curve from stall to the coupling point. The pump speed curve shown in Figure 5 has this form of equation in the 3rd and 4th phases, only. The constants of course are different and give a flatter slope to the curve.

For a torque converter in which a turbine member rotates in unison with the output shaft and discharges the fluid directly to the pump member, the pump speed equation is, $$\text{Pump speed} = \frac{C_3}{Q} + C_4 N t + C_5 Q$$

where $N t$ is the turbine speed and $C_3$, $C_4$, and $C_5$ are constants according to: the radii, the blade angles, and passage areas at the exits of the particular turbine and pump members, and the pump input torque; which, in the particular torque converter environment, gives a speed curve extending from the specific stall speed to the specific coupling point speed. It is apparent that there will be a sagging tendency of the input speed curve from stall to the coupling point, though somewhat less than that of the preceding equation. The pump speed curve shown in Figure 5 has this form of equation in the 1st and 2nd phases, but the constants are different to permit a rapid rise of the input speed. The equation of the curve in the coupling phase is similar to that for the 1st and 2nd phases, but with constants differing, respectively, as the features of the second and third turbine exits.

Figure 15 illustrates the characteristics of the embodiment shown in Figure 1, in comparison with, the published characteristics of two well known automotive torque converters. The short dash curves, marked "A," are those of a torque converter in which the final stator member dominates, through the torque conversion range, the fluid discharged to the pump member entrance. The long dash curves, marked "B," are those for a torque converter in which the final turbine member rotationally secured to the output shaft, dominates the fluid discharged to the pump member entrance. These curves illustrate the superiority of the embodiment of Figure 1, regarding: the freedom granted to the engine to develop power, the range of torque conversion, torque multiplication, and efficiency.

Figure 16 illustrates the averaged power characteristics of four recent and well known automotive engines. The power curve is plotted as per cent of maximum power to show the relation to engine speed. The specific fuel curve, lbs. per B. H. P. hr. is included, to indicate the most economical range of operation.

Figure 17 illustrates the power transmitter effectiveness of the embodiment of Figure 1. For comparison, similar curves are included for torque converters "A" and "B," the characteristics of which were shown in Figure 15. All of these effectiveness curves are based on the curves of Figures 15 and 16. The power transmitter effectiveness at a particular output speed being, the respective torque converter efficiency multiplied by the ratio of maximum power permitted by the respective pump (engine) speed. This comparison clearly shows the superiority of the embodiment of Figure 1, regarding power transmitter effectiveness. This improvement is particularly advantageous in the passing zone of 20 to 60 M. P. H., which is a torque converter output speed of about 800 to 2400 R. P. M. In this zone, relative to torque converter "A," the available power is 10 to 20 per cent greater. Also, in this zone the road load power is 10 to 30 per cent of the available output power from torque converter "A." Hence, the torque converter illustrated in Figure 1, has 15 to 25 per cent more power available for acceleration or hill climbing than torque converter "A." For most of the torque conversion range, torque converter "B" is somewhat less deficient in power transmitter effectiveness than torque converter "A"; but at the coupling point the deficiency is about the same. This is more serious for torque converter "B" inasmuch as its deficiency is chiefly due to inefficiency as shown in Figure 15. This means lowered economy.

Other embodiments

It has been shown that, for a particular power source, the humpbacked form of input speed curve increases the torque converter output power in the torque conversion range. The embodiment illustrated by Figure 1 is only one combination of bladed members which may constitute a torque converter. There are other combinations of bladed members which have specific utility, and for which, this humpbacked input speed curve will be very advantageous. Some of these will be subsequently disclosed.

As previously explained, this humpbacked input speed characteristic is obtained by uniquely reversing the trend of the moment of momentum of the fluid discharged to a pump member, according to the influence of a one-way acting turbine member interposed between the exit of a stator member and the entrance of a pump member, the blades of the interposed turbine member being, individually or collectively, forwardly firm, but backwardly yieldable, rendering the interposed turbine member able to vectorially reduce, but ineffective to vectorially increase, the moment of momentum of the circulating fluid. There are many arrangements for rendering a torque converter member one-way acting, as well as many known types of one-way devices. Also, there are numerous devices which, with or without supplementary control, simulate the influence of a one-way device. Just to emphasize the multiplicity and diversity of such devices, without trying to be all-inclusive, some will be mentioned.

In the class of one-way devices are arrangements employing: pawls, ratchets, wedging elements, toggles, sprags, or wrapping elements.

There are numerous types of clutches which may be actuated by a controlled power medium—such as, hydraulic, mechanical, vacuumatic, pneumatic and electrical. If the regulator is speed ratio conscious, the clutch influence will be equivalent to that of a one-way device. Also, if the regulator responded to torque reversal and to relative speed reversal between the clutch opposing elements, respectively, to release, and to apply, the influence would be equivalent to that of a one-way device. Another equivalent regulator would be that with a signal vane radially pivoted on the interposed turbine member ahead of the blade entrance, to signal the regulator to release, or to apply, the clutch, according to the angle of incidence of the approaching fluid relative to the member.

If the clutch is basically speed responsive, the release of the third turbine member will tend to be early for high input torques, and late for low torques. This tends to increase the shock head losses for the extreme torques; however, for some applications, there is some merit in an early release for high input torques—it permits a higher engine speed and more engine power earlier in the torque conversion range. Consequently, for this usage, a speed-responsive clutch may be considered a practical simulation of a one-way device. The clutch may be centrifugal acting by design, or separately controlled by a speed responsive regulator, with or without, supplementary influence of engine manifold pressure, and/or throttle position.

The interposed turbine member may be one-way acting by virtue of its blades being, individually, forwardly firm, but backwardly yieldable. Each blade may be hinged with a suitable forward stop. The hinge axes may be substantially radial near the blade entrances with one or more rows of blades as disclosed by Dodge Patent 1,959,349, and by Coats Patent 1,760,397; or, the hinge axes may be substantially parallel and adjacent to the shrouds, as indicated by Teagno Patent 2,376,462.

This interposed turbine member could be a retractile member. Physically, this would involve a reshaping of the fluid recirculating path and providing the interposed turbine member with passages having more radial trend. The member would be retracted axially from the fluid path when its blades tended to increase the forward moment of momentum of the circulating fluid. There are many forms of retractile members and retracting mechanisms. Some early forms of retractile members are disclosed by Fottinger Patent 1,199,361. Helically retractile members are disclosed by Jandasek Patent 2,326,655 and Lysholm Patent 2,292,384.

Some combinations of bladed members, and some variations of connecting structures between members and their related external components, are somewhat diagrammatically illustrated in Figures 18–23 incl. In the description of these embodiments, the principal members are mentioned, and the distinctive features, as well as the specific utility, are explained; but to avoid unnecessary repetition, a reasonable degree of reliance is placed on the embodiment illustrated in Figure 1, which was described and explained in detail. Comparable members, elements, and components are numbered with the same tenths and unitary digits used in Figure 1, but preluded with a particular hundredths digit. Members are considered comparable according to similarity of influence and function, rather than similarity of name; that is, if a particular first turbine member is most comparable to the second turbine member in Figure 1, its reference numbers have the respective tenths and unitary digits of the second turbine member in Figure 1.

Figure 18 illustrates another form of drive structure from the third turbine member 174 to the torque converter output shaft 130. The reaction shaft 112 is extended and fastened to the stationary housing 110 by adapter 107. The combination of bladed members is the same as illustrated in Figure 1.

This particular drive structure from the third turbine member to the output shaft includes two gear sets and a countershaft 104 rotationally mounted in the stationary housing structure. The shell 176 of the third turbine member 174 has an inwardly extending element 179 secured to a flanged sleeve 101 rotationally free in the pump hub sleeve 156. The outer end of this flanged sleeve is secured to gear 102 which drives a gear 103 rotationally free on countershaft 104. The other end of this countershaft is secured to gear 105 which meshes with gear 106 mounted on, and secured to, the output shaft 130. Interposed between gear 103 and the countershaft 104, is a one-way device 120, which permits the third turbine member to rotate forwardly at a speed slower but not higher than a specific ratio of the output shaft speed—the specific ratio being the total ratio of the gearing.

One advantage of this arrangement is that the speed range and the intensity of the influence of the third turbine member may be easily varied by selection of gearing most desirable for the particular application. If the gearing ratio permits the third turbine member to rotate forwardly faster than the output shaft, the effect, relative to unisonant rotation, is a more rapid increase of the pump member speed, but over a shorter range of output shaft speed. Also, there is an increase in the output shaft torque—the increase being equal to the housing reaction torque attending the specific gearing. Contratrends, of course, are obtained when the gearing ratio restricts the third turbine member to a forward speed slower than that of the output shaft. If desired, optional ratios may be provided by selective gearings; or, a variable ratio may be obtained by using planetary gearing with the third branch of the gearing rotationally influenced by another component, such as the pump member.

Another advantage is that the physical environment of this arrangement permits the use of a smaller one-way device than that of the embodiment of Figure 1; also, the location is more accessible for the use and control of a simulating device.

A novel arrangement may be incorporated in the drive structure of the third turbine member for reducing vehicle creep. Actually, this may also be provided in the structure of Figure 1, but the accessibility of the drive structure of Figure 18 tends to make it more favorable. This creep reduction may be obtained by merely releasing, rotationally, the third turbine member when the vehicle is stopped with the engine idling. For the characteristics of Figure 1, and normal idling speeds, this would reduce the pump member torque, hence the creep torque, to approximately one half. Some of this reduction could be sacrificed to allow a lower design stall speed. The arrangement would functionally consist of a small clutch in series drive relationship with the one-way device 120, the clutch being controlled by a speed responsive regulator associated with the engine, or possibly by throttle position or manifold pressure. For the sake of simplicity, the one-way device could be omitted, the clutch serving both functions with speed responsive regulation, with or without, supplementary influences previously mentioned.

The general arrangement in Figure 18 may be in line with the trend. Serious consideration has been given to the use of "drop gearing," to lower the transmission and the vehicle drive shaft relative to the floor structure. For this arrangement, the countershaft 104 would be the input shaft to the transmission.

The embodiment in Figure 19 has the same combination of bladed members and the same torque converter characteristics as that in Figure 1. The differences are those of structural connections, the utility of each depending on the nature of the application environment.

In this embodiment, part of the reaction structure of the first stator member 280 is a one-way device 221 interposed between the first stator core 283 and the third stator core 295, preventing backward, but permitting forward rotation of the first stator member 280 relative to the third stator member 292. This arrangement tends to be advantageous for use with heavy duty engines, having medium or low operating speeds. The principal advantage is a matter of balancing thrust forces of the first and the third stator members—near stall, the first and second stator members exert large reaction forces, axially, toward the engine, but that of the third stator member is in the opposite direction. Also, the third stator member, by virtue of its large blade angles, tends to be torsionally stronger than the second stator member, and hence, more suitable for transmitting the reaction torque of the first stator member to the reaction shaft. Torque requirements being reduced, the second stator member 286 has a single one-way device 223 in this arrangement. The major disadvantage is that, the rotational speed differential between the first and third stator members is larger than between the first and second stator members, as shown in Figure 5; however, for use with a lower speed engine, this speed differential will be likewise reduced, retaining reasonable sliding velocities between the elements of one-way device 221.

Another departure in the structure of Figure 19 from that of Figure 1, is that the one-way device for the third stator member is located at the outer end of the reaction shaft; being, a one-way device 222 interposed between the stationary housing 210 and the reaction shaft 212. At the inner end, the third stator member is rotationally secured to the reaction shaft—from the third stator shell 294, a hub element 296 is secured by key 297 to race 214 which is splined to reaction shaft 212. This construction permits the use of a one-way device which inherently has physical proportions inconsistent with the confined space inside the torque converter. Also, this reaction shaft rotates with the third stator member in the coupling phase; thus, reducing the sliding velocity of the second stator elements and the thrust sliding velocity between the thrust and retaining surfaces, respectively, of the reaction structure and the second turbine hub.

The other modification in Figure 19 is that circumferentially spaced screws 265 provide the drive connection between the mating parts 264 and 273, respectively, of the first turbine member 260 and the second turbine member 268. This departure from Figure 1 is largely a matter of preference and option.

Figure 20 illustrates an embodiment having the same procession of rows of blades in the fluid recirculating path as shown in Figure 1; but in Figure 20, the reaction structure, interposed between and rotationally secured to the first stator core 383 and the second stator core 389, is an annular web 321 conjoining the first stator member and the second stator member. As shown for exemplification, this web is cast integrally with the first and second stator members. This replaces the one-way device 21 of Figure 1 as a matter of simplicity. To moderate the deficiencies relative to characteristics of Figure 1, the speed differential between the first and second stator members, as shown in Figure 5, would be reduced by modification of the blades of these members and at least the adjacent members, so that the first and second stator members would tend to free-whirl with similar speeds. These changes should include a revision of design radii. Although the characteristics are somewhat deficient relative to those of Figure 1, the simplicity is very desirable. Considering other improvements being made, such as for blade contours, it is reasonable to expect characteristics, eventually, for this construction which are comparable to those now shown for Figure 1.

Figure 21 somewhat diagrammatically illustrates an embodiment in which, one stator member 492 supplants the second and third stator members, 86 and 92 respectively, of Figure 1. In sequence from the entrance of the pump member in the direction of fluid circulation, the members are: the pump member 450, the first turbine member 460, the first stator member 480, the second turbine member 468, the second stator member 492, and the third turbine member 474. A one-way device 421, interposed between the first stator core 483 and the second stator core 495, prevents backward but permits forward rotation of the first stator member 480 relative to the second stator member 492. The operation of this combination is similar to that of Figure 1, considered without stator member 86. In consideration of this omission, a general revision of blade angles with some modifications of radii is required to comply with the resultant rate of fluid circulation.

This combination is more simple and may be made axially shorter than that of Figure 1. Characteristically this combination gives a high stall torque ratio, but a reduced range of torque conversion, if high efficiency at the coupling point is considered a prime requisite. The utility of this combination tends to be for applications requiring a high stall torque ratio, and using a low speed power source, and consequently, a short speed range of torque conversion. On the contrary, there are several well known automotive torque converters which have one stator member, the blades of which are positioned in the inner half of the fluid recirculating path. This combination in Figure 21 is far superior to those particular torque converters. Inherently, the first stator member, being positioned in the outer half of the fluid path, gives a high stall torque ratio, and permits the second stator member in the inner half of the fluid path to be featured for higher efficiency at the coupling point, and/or, a wider speed range of torque conversion. Also, the final turbine member makes its unique contribution to efficiency and power transmitter effectiveness, by reducing shock head losses at the pump member entrance, and by providing a humpbacked input speed curve.

Figure 22 is a diagrammatic illustration of an embodiment differing from that of Figure 1, in that, the first stator member 80 and its one-way device 21 is omitted, and the first and second turbine members 60 and 68 are formed as one, being the first turbine member 568. In sequence from the entrance of the pump member in the direction of fluid circulation, the members are: the pump member 550, the first turbine member 568, the first stator member 586, the second stator member 592, and the second turbine member 574. Interposed between the first turbine member and the second turbine member, is a one-way device 520, enabling the second turbine member to contribute torque to the output shaft, but only in the forward direction—the first turbine member and its hub element 531 serving as a drive structure for the second turbine member. The operation of this combination is similar to that of Figure 1, considered without stator member 80. Such a change, of course, necessitates a general revision of blade angles and radii, in consideration of different fluid circulation.

This combination illustrated in Figure 22 is quite obviously simpler than that in Figure 1. Characteristically compared to the combination in Figure 1, this combination naturally has a lower stall torque ratio; and generally would be made with a lower efficiency at the coupling point and a shorter range of torque conversion to favor and bolster torque ratio at stall. Such a comparison is somewhat unfair and misleading—the comparison should be relative to the current status of the art. There are several well known automotive torque converters which have a similar stator arrangement. These may properly be considered the best of the known automotive torque converters—at least, these are the only torque converters used for general driving without either an automatic change gearing or a lock-up clutch for cruising, or both. Compared to these torque converters, the combination in Figure 22 is a decided improvement relative to efficiency and to power transmitter effectiveness, by virtue of the unique influence of the final turbine member which more effectively reduces shock head losses and provides the humpbacked input speed curve.

Figure 23 diagrammatically illustrates a very simple embodiment using only one stator member, the blades of which are positioned in the inner half of the fluid recirculating path. The members, named in sequence from the entrance of the pump member in the direction of fluid circulation are: the pump member 650, the first turbine member 668, the stator member 692, and the second turbine member 674. The first turbine member has a hub element 631 keyed to output shaft 630. Interposed between the first turbine core elements 666 and the second turbine core 677 is a one-way device 620, enabling the second turbine member to contribute torque to the output shaft, but only in the forward direction. A one-way device 622 is interposed between the stationary reaction shaft 612 and the stator shell 694, enabling the stator member to transmit torque to the reaction shaft but only in the backward direction.

There are several well known automotive torque converters which have a comparable stator arrangement. This arrangement severely hampers stall torque ratio, coupling point efficiency, and speed range of torque conversion; consequently, all of these automotive installations employ for general driving, either an automatic change gearing or a lock-up clutch for cruising, or both. Relative to these automotive torque converters, the combination in Figure 23 is far superior in efficiency and in power transmitter effectiveness, due to the unique influence of the final turbine member which reduces shock head losses and provides the humpbacked form of input speed curve.

In any of the embodiments disclosed, the final stator member could be rotationally secured relative to the stationary housing, instead of being one-way acting by virtue of being mounted through a one-way device. Then a torque division phase, commonly referred to as over-drive, would supplant the coupling phase of operation. An arrangement with this particular feature is disclosed by Heppner Patent 2,216,411.

In the discussion of the embodiment illustrated in Figure 1, it was shown that the stator member positioned in the outer half of the fluid recirculating path relieved the stator member positioned in the inner half of the fluid recirculating path of much of the stall reaction requirements for which it is physically at a disadvantage; thus, permitting the inner stator member to be constructed with a form conducive of high efficiency in the coupling point region. Following similar reasoning, another stator member may be provided at about the average radius of the fluid recirculating path, in an interrupted space of a turbine member, such as, the second turbine member 68 in Figure 1. This would relieve the inner stator of much of the reaction requirements midway in the torque conversion range; hence, the inner stator could be further modified for higher efficiency in the coupling point region, or for a larger speed range of torque conversion as required for a very high speed power source.

Considering high efficiency in the coupling point region a prime requisite, the nature of the stall torque ratio, and the available speed range of torque conversion, for a particular hydrodynamic torque converter is indicated by the features of its reaction arrangement—relative to a transmission with selective gearing: a stator member in the outer portion of the fluid path, simulates a low gear ratio; a stator member in the inner portion of the fluid path, resembles an intermediate gear ratio; and, the fluid coupling phase of operation replaces the clutched through drive. The trend is towards more extensive torque converter operation. To properly replace a mechanical gearing ratio, it is logical that a member, characteristically comparable, should be incorporated in the torque converter.

Digest

The principal invention of this specification is the concept of improvements in power transmitter effectiveness of various combinations of bladed members constituting hydrodynamic torque converters. The conceptive ideas relate to influencing the properties of the circulating fluid in the region between the exit of a stator member and the entrance of a pump member; specifically, to vectorially reducing the moment of momentum and the circumferential velocity of the circulating fluid in an early phase, or phases, of operation, but without appreciable counter-influences in subsequent phases on these properties of the circulating fluid—thereby, increasing the efficiency of the torque converter, and permitting the power source more freedom to develop power. The mode of physical attainment is a turbine member interposed between the exit of a stator member and the entrance of a pump member, characterized further, by being approximately one-way acting relative to the circumferential velocity of the circulating fluid; thereby, being capable of vectorially reducing the moment of momentum of the circulating fluid and to transmit the change of moment of momentum as torque to the torque converter output shaft, but ineffective to vectorially increase the moment of momentum of the circulating fluid.

So far as I am aware, I am the first to have this conception; or to provide in a hydrodynamic torque converter a bladed member so characterized; or to devise in hydrodynamic torque converters, combinations of bladed members having various pump, turbine, and stator members correlated and combined with a member so characterized. This invention creates for hydrodynamic torque converters a new class of combinations of bladed members which are physically and characteristically novel, unique, and superior. Hence, I claim this invention generically with essential structural definition to properly characterize and distinguish it, and with supplementary claims further defining form, structure, and/or features.

Also, I claim the subcombination comprising the characterized turbine member, and with supplementary claims further defining form, structure, and/or features.

Furthermore, I claim plural species with supplementary claims further defining form, structure, and/or features.

As has been thoroughly emphasized, the inventions hereof pertain to improvements in the hydrodynamic transmission of power, during which, the rate of fluid circulation of a combination of members varies with the phase of operation and the power transmitted, but is maintained in the same general direction with respect to the procession of members in the toroidal circuit; and that direction is referred to as the direction of fluid circulation, or according to SAE recommendations, the "fluid flow direction."

Also, in accordance with the aforestated SAE recommendations, the terms, "first," "second," "third," and "final," are used in the foregoing descriptions and in the appended claims to indicate the sequence of the particular character of member in the fluid flow direction in the recirculating path, referred to as the "circuit," starting at the entrance of the first pump member.

Accordingly, a "preceding" member relative to a specified member means a member which is situated in the fluid circuit ahead of that specified member, that is, is situated from the specified member in the direction counter to the fluid flow direction; and a "subsequent" or "following" member relative to a specified member means a member which is situated in the fluid circuit from the specified member in the same direction as that of the fluid flow.

The terms, "juxtaposed," "interposed," and "adjacent," are used in the claims in reference to the positioning of bladed-members to indicate sequential position in the procession of bladed-members in the toroidal fluid circuit, rather than the extent of the unoccupied intervening space in the fluid circuit.

In this specification, the usage of the terms "member" and "members" is confined to references to the bladed-members. To eliminate unessential words in the claims, the word "member" is usually omitted where a specific character of member is recited. Accordingly, as used in the claims: "pump" means a pump member; "turbine," a turbine member; and "stator," a stator member.

In conformity with general practice, the phases of operation for the foregoing disclosures are numbered sequentially fom stall to the coupling point, the operation thereafter being the coupling phase. Accordingly, in reference to a portion of the torque conversion range of operation, an "early phase" means a phase of operation in the first half of that torque conversion range which starts at stall; and a "late phase" of torque conversion means a phase of operation in the second half of that torque conversion range which terminates at the coupling point.

It is, of course, understood that the present invention is not limited to the particular forms and structures shown in the drawings, or otherwise revealed, for disclosure and explanatory purposes, but also embraces modifications within the scope of the appended claims.

I claim:

1. In a hydrodynamic torque converter drive having pump, stator, and turbine bladed-members arranged in spaced relationship in a toroidal circuit for fluid recirculation, the combination comprising: at least one pump, and means to connect each pump of said combination to an input power structure; at least one stator, and reaction structure means to associate each stator of said combination with a stationary support structure to therewith render each said stator firm against backward rotation; a plurality of turbines, including a specially situated turbine and an array of blades thereof, said specially situated turbine relative to said stator and said pump members being interposed between a stator exit thereof and a pump entrance thereof; driven structure means to associate said turbines with an output power shaft to therewith afford, for each of said turbines, restraint of forward rotation for the conversion and transmission of energy to said output shaft, said driven structure means pertinent to said specially situated turbine being thus operative in an early phase of the torque conversion range to enable said blades of said specially situated turbine to vectorially reduce the moment of momentum of circulating fluid; and, restrictive influence means for said specially situated turbine operative in a late phase of the torque conversion range to render said blades of said specially situated turbine backwardly yieldable to circulating fluid and thus ineffective to vectorially increase the moment of momentum thereof while another of said plurality of turbines remains effective to vectorially reduce the moment of momentum of said fluid.

2. In a hydrodynamic torque converter drive having pump, stator, and turbine bladed-members arranged in spaced relationship in a toroidal circuit for fluid recirculation, the combination comprising: a pump situated with its entrance in the inner half and its exit in the outer half of said circuit, and means to connect said pump to an input power structure; at least one stator, including a final stator situated in said circuit with an interrupted space between its exit and said pump entrance, and reaction structure means to associate each stator of said combination with a stationary support structure to therewith render each said stator firm against backward rotation; a plurality of turbines, including a first turbine situated in said circuit with its entrance adjacent to said pump exit, and a final turbine having an array of blades interposed between said final stator exit and said pump entrance; driven structure means to associate said turbines with an output power shaft to therewith afford, for each of said turbines, restraint of forward rotation for the conversion and transmission of energy to said output shaft, said driven structure means pertinent to said final turbine being thus operative in an early phase of the torque conversion range to enable said final turbine blades to vectorially reduce the moment of momentum of circulating fluid; and, restrictive influence means for said final turbine operative in a late phase of the torque conversion range to render said final turbine blades backwardly yieldable to circulating fluid and thus ineffective to vectorially increase the moment of momentum thereof while another of said plurality of turbines remains effective to vectorially reduce the moment of momentum of said fluid.

3. The combination defined in claim 2 in which said restrictive influence means includes means sensitive and responsive to backward impression of said circulating fluid on said final turbine blades to cause said backward yielding thereof.

4. The combination defined in claim 2 in which said restrictive influence means and said driven structure means pertinent to said final turbine include a one-way device interposed in said driven structure means and operative therewith to render said final turbine blades collectively one-way acting, capable of vectorially reducing but ineffective for vectorially increasing the moment of momentum of circulating fluid.

5. The combination defined in claim 2 in which said restrictive influence means and said driven structure means pertinent to said final turbine include a driven element extending from a core element of said final turbine to a core element of said first turbine, said driven element including a one-way device interposed therein and operative therewith to permit backward rotation and to prevent forward rotation of said final turbine relative to said first turbine.

6. The combination defined in claim 2 in which: said restrictive influence means and said driven structure means pertinent to said final turbine include a driven element extending from a core element of said final turbine to a core element of said first turbine, said driven element including a one-way device interposed therein and operative therewith to permit backward rotation and to prevent forward rotation of said final turbine relative to said first turbine; and, the features of said final turbine include the relationship of the design radius at its exit being larger than the design radius at its entrance.

7. The combination defined in claim 2 in which said reaction structure means includes one-way device means to permit forward rotation operative to render each stator of said combination ineffective to vectorially reduce the moment of momentum of circulating fluid.

8. The combination defined in claim 2 in which: said reaction structure means includes one-way device means to permit forward rotation operative to render each stator of said combination ineffective to vectorially reduce the moment of momentum of circulating fluid; and, the features of said plurality of turbines include the relationship of the design radius at the exit of said final turbine being smaller than the design radius at the exit of the turbine which, relative to said final turbine, is the nearest preceding turbine in said circuit.

9. The combination defined in claim 2 in which said restrictive influence means and said driven structure means pertinent to said final turbine include a clutching mechanism having opposing elements thereof interposed in drive series relationship in said driven structure means, and having clutching control means operative to effect and maintain, approximate rotational unisonance of said opposing elements when thereby said final turbine transmits considerable energy to said output power shaft, and approximate rotational freedom between said opposing elements when otherwise said final turbine would extract considerable energy from said output power shaft.

10. The combination defined in claim 9 in which said clutching control means includes wedging elements disposed and operative between said opposing elements to prevent relative rotation therebetween in one direction and to permit relative rotation therebeween in the opposite direction.

11. In a hydrodynamic torque converter drive having bladed-members, at least one pump, at least one stator, and a plurality of turbines, arranged in spaced relationship in a toroidal circuit for fluid recirculation, the combination comprising: a turbine and an array of blades thereof situated in said circuit for the transition of circulating fluid, and for the conversion of properties thereof, from a stator exit to a pump entrance; driven structure means to associate said turbine with an output power shaft to therewith restrain forward rotation of said turbine in an early phase of the torque converter range, and thus to enable said turbine blades to vectorially reduce the moment of momentum of said circulating fluid; and, restrictive influence means operative in a late phase of the torque conversion range to render said turbine blades backwardly yieldable to said circulating fluid and thus ineffective to vectorially increase the moment of momentum thereof while another of said plurality of turbines remains effective to vectorially reduce the moment of momentum of said fluid.

12. The combination defined in claim 11 in which said restrictive influence means includes means sensitive and responsive to backward impression of said circulating fluid on said turbine blades to cause said backward yielding thereof.

13. In a hydrodynamic torque converter drive having bladed-members, at least one pump, at least one stator, and a plurality of turbines, arranged in spaced relationship in a toroidal circuit for fluid recirculation, the combination comprising: a turbine and an array of blades thereof situated in said circuit for the transition of circulating fluid, and for the conversion of properties thereof, from a stator exit to a pump entrance; driven structure means to associate said turbine with an output power shaft for the restraint of forward rotation of said turbine; and, a one-way device interposed in said driven structure means and operative therewith to render said turbine blades collectively one-way acting, capable of vectorially reducing but ineffective for vectorially increasing the moment of momentum of fluid circulating in said circuit while another of said plurality of turbines remains effective to vectorially reduce the moment of momentum of said fluid.

14. The combination defined in claim 13 in which the features of said turbine include the relationship of the design radius at its exit being larger than the design radius at its entrance.

15. In a hydrodynamic torque converter drive having bladed-members, at least one pump, at least one stator, and a plurality of turbines, arranged in spaced relationship in a toroidal circuit for fluid recirculation, the combination comprising: a turbine and an array of blades thereof situated in said circuit for the transition of circulating fluid, and for the conversion of properties thereof, from a stator exit to a pump entrance; driven structure means to associate said turbine with an output power shaft for the transmission of energy thereto; and, a clutching mechanism having opposing elements thereof interposed in drive series relationship in said driven structure means, and having clutching control means operative to effect and maintain, during the transmission of power by said hydrodynamic drive to said output power shaft, approximate rotational unisonance of said opposing elements when thereby said turbine transmits considerable energy to said output power shaft, and approximate rotational freedom between said opposing elements when otherwise said turbine would extract considerable energy from said output power shaft while another of said plurality of turbines remains effective to vectorially reduce the moment of momentum of said fluid.

16. The combination defined in claim 15 in which said clutching control means includes wedging elements disposed and operative between said opposing elements to prevent relative rotation therebetween in one direction and to permit relative rotation therebetween in the opposite direction.

17. In a hydrodynamic torque converter drive having bladed-members, one pump, three stators, and three turbines, arranged in spaced relationship in a toroidal circuit for fluid recirculation, the combination comprising: a pump situated with its entrance in the inner half and its exit in the outer half of said circuit, and means to connect said pump to an input power structure; a first stator situated in the outer half of said circuit with an interrupted space between its entrance and said pump exit; a second stator situated in the inner half of said circuit with two interrupted spaces between its exit and said pump entrance; a third stator situated in the inner half of said circuit with its entrance adjacent to said second stator exit; reaction structure means to associate said stators with a stationary support structure to therewith render each of said stators firm against backward rotation; a first turbine interposed between said pump exit and said first stator entrance; a second turbine situated with its entrance adjacent to the exit of said first stator and its exit adjacent to the entrance of said second stator; a third turbine having an array of blades interposed between the exit of said third stator and said pump entrance; driven structure means to associate said turbines with an output power shaft to therewith afford, for each of said turbines, restraint of forward rotation for the conversion and transmission of energy to said output shaft, said driven structure means pertinent to said third turbine being thus operative in an early phase of the torque conversion range to enable said third turbine blades to vectorially reduce the moment of momentum of circulating fluid; and, restrictive influence means for said third turbine operative in a late phase of the torque conversion range to render said third turbine blades backwardly yieldable to circulating fluid and thus ineffective to vectorially increase the moment of momentum thereof while said second turbine remains effective to vectorially reduce the moment of momentum of said fluid.

18. The combination defined in claim 17 in which said restrictive influence means and said driven structure means pertinent to said third turbine include a one-way device interposed in said driven structure means and operative therewith to render said third turbine blades collectively one-way acting, capable of vectorially reducing but ineffective for vectorially increasing the moment of momentum of circulating fluid.

19. The combination defined in claim 17 in which said restrictive influence means and said driven structure means pertinent to said third turbine include a driven element extending from a core element of said third turbine to a core element of said first turbine, said driven element including a one-way device interposed therein and operative therewith to permit backward rotation and to prevent forward rotation of said third turbine relative to said first turbine.

20. The combination defined in claim 17 in which: said restrictive influence means and said driven structure means pertinent to said third turbine include a driven element extending from a core element of said third turbine to a core element of said first turbine, said driven element including a one-way device interposed therein and operative therewith to permit backward rotation and to prevent forward rotation of said third turbine relative to said first turbine; and, the features of said third turbine include the relationship of the design radius at its exit being larger than the design radius at its entrance.

21. The combination defined in claim 17 in which said reaction structure means includes one-way device means to permit forward rotation operative to render each one of said stators ineffective to vectorially reduce the moment of momentum of circulating fluid.

22. The combination defined in claim 17 in which said reaction structure means includes one-way device means to permit forward rotation operative to render each one of said stators ineffective to vectorially reduce the moment of momentum of circulating fluid; and, said restrictive influence means and said driven structure means pertinent to said third turbine include a driven element extending from a core element of said third turbine to a core element of said first turbine, said driven element including a one-way device interposed therein and operative therewith to permit backward rotation and to prevent forward rotation of said third turbine relative to said first turbine.

23. The combination defined in claim 17 in which: said reaction structure means includes one-way device means to permit forward rotation operative to render each one of said stators ineffective to vectorially reduce the moment of momentum of circulating fluid; and, the features of said second and third turbines include the relationship of the design radius at the exit of said third turbine being smaller than the design radius at the exit of said second turbine.

24. The combination defined in claim 17 in which said reaction structure means includes: a reaction shaft and a one-way device arranged to connect said third stator with said stationary support structure and to therewith prevent backward rotation and permit forward rotation of said third stator; a one-way device adapted to prevent backward rotation and to permit forward rotation of said second stator relative to said reaction shaft; and, a core situated one-way device adapted to prevent backward rotation and to permit forward rotation of said first stator relative to one of said stators situated in the inner half of said circuit.

25. The combination defined in claim 17 in which said reaction structure means includes: a reaction shaft and a one-way device arranged to connect said third stator with said stationary support structure and to therewith prevent backward rotation and permit forward rotation of said third stator; a one-way device adapted to prevent backward rotation and to permit forward rotation of said second stator relative to said reaction shaft; and, a core conjunctive element to rotationally secure said first stator to said second stator.

26. In a hydrodynamic torque converter drive having bladed-members, one pump, two stators, and three turbines, arranged in spaced relationship in a toroidal circuit for fluid recirculation, the combination comprising: a pump situated with its entrance in the inner half and its exit in the outer half of said circuit, and means to connected said pump to an input power structure; a first stator situated in the outer half of said circuit with an interrupted space between its entrance and said pump exit; a second stator situated in the inner half of said circuit with an interrupted space between its exit and said pump entrance; reaction structure means to associate said stators with a stationary support structure to therewith render each of said stators firm against backward rotation; a first turbine interposed between said pump exit and said first stator entrance; a second turbine situated with its entrance adjacent to the exit of said first stator and its exit adjacent to the entrance of said second stator; a third turbine having an array of blades interposed between said second stator exit and said pump entrance; driven structure means to associate said turbines with an output power shaft to therewith afford, for each of said turbines, restraint of forward rotation for the conversion and transmission of energy to said output shaft, said driven structure means pertinent to said third turbine being thus operative in an early phase of the torque conversion range to enable said third turbine blades to vectorially reduce the moment of momentum of circulating fluid; and, restrictive influence means for said third turbine operative in a late phase of the torque conversion range to render said third turbine blades backwardly yieldable to circulating fluid and thus ineffective to vectorially increase the moment of momentum thereof while said second turbine remains effective to vectorially reduce the moment of momentum of said fluid.

27. The combination defined in claim 26 in which said restrictive influence means and said driven structure means pertinent to said third turbine include a driven element extending from a core element of said third turbine to a core element of said first turbine, said driven element including a one-way device interposed therein and operative therewith to permit backward rotation and to prevent forward rotation of said third turbine relative to said first turbine.

28. The combination defined in claim 26 in which: said restrictive influence means and said driven structure means pertinent to said third turbine include a driven element extending from a core element of said third turbine to a core element of said first turbine, said driven element including a one-way device interposed therein and operative therewith to permit backward rotation and to prevent forward rotation of said third turbine relative to said first turbine; and, the features of said third turbine include the relationship of the design radius at its exit being larger than the design radius at its entrance.

29. The combination defined in claim 26 in which said reaction structure means includes one-way device means to permit forward rotation operative to render each one of said stators ineffective to vectorially reduce the moment of momentum of circulating fluid.

30. The combination defined in claim 26 in which: said reaction structure means includes one-way device means to permit forward rotation operative to render each one of said stators ineffective to vectorially reduce the moment of momentum of circulating fluid; and, said restrictive influence means and said driven structure means pertinent to said third turbine include a driven element extending from a core element of said third turbine to a core element of said first turbine, said driven element including a one-way device interposed therein and operative therewith to permit backward rotation and to prevent forward rotation of said third turbine relative to said first turbine.

31. The combination defined in claim 26 in which said reaction structure means includes: a reaction shaft and a one-way device arranged to connect said second stator with said stationary support structure and to therewith prevent backward rotation and permit forward rotation of said second stator; and, a core situated one-way device adapted to prevent backward rotation and to permit forward rotation of said first stator relative to said second stator.

32. In a hydrodynamic torque converter drive having bladed-members, one pump, two stators, and two turbines, arranged in spaced relationship in a toroidal circuit for fluid recirculation, the combination comprising: a pump situated with its entrance in the inner half and its exit in the outer half of said circuit, and means to connect said pump to an input power structure; a first stator situated in the inner half of said circuit with two interrupted spaces between its exit and said pump entrance; a second stator situated with its entrance adjacent to said first stator exit; reaction structure means to associate said stators with a stationary support structure to therewith render each one of said stators firm against backward rotation; a first turbine situated with its entrance adjacent to said pump exit and its exit adjacent to the entrance of said first stator; a second turbine having an array of blades interposed between the exit of said second stator and said pump entrance; driven structure means to associate said turbines with an output power shaft to therewith afford, for each of said turbines, restraint of forward rotation for the conversion and the transmission of energy to said output shaft, said driven structure means pertinent to said second turbine being thus operative in an early phase of the torque conversion range to enable said second turbine blades to vectorially reduce the moment of momentum of circulating fluid; and, restrictive influence means for said second turbine operative in a late phase of the torque conversion range to render said second turbine blades backwardly yieldable to circulating fluid and thus ineffective to vectorially increase the moment of momentum thereof while said first turbine remains effective to vectorially reduce the moment of momentum of said fluid.

33. The combination defined in claim 32 in which said restrictive influence means and said driven structure means pertinent to said second turbine include a driven element extending from a core element of said second turbine to a core element of said first turbine, said driven element including a one-way device interposed therein and operative therewith to permit backward rotation and to prevent forward rotation of said second turbine relative to said first turbine.

34. The combination defined in claim 32 in which: said restrictive influence means and said driven structure means pertinent to said second turbine include a driven element extending from a core element of said second turbine to a core element of said first turbine, said driven element including a one-way device interposed therein and operative therewith to permit backward rotation and to prevent forward rotation of said second turbine relative to said first turbine; and, the features of said second turbine include the relationship of the design radius at its exit being larger than the design radius at its entrance.

35. The combination defined in claim 32 in which said reaction structure means includes one-way device means to permit forward rotation operative to render each one of said stators ineffective to vectorially reduce the moment of momentum of circulating fluid.

36. The combination defined in claim 32 in which: said reaction structure means includes one-way device means to permit forward rotation operative to render each one of said stators ineffective to vectorially reduce the moment of momentum of circulating fluid; and, said restrictive influence means and said driven structure means pertinent to said second turbine include a driven element extending from a core element of said second turbine to a core element of said first turbine, said driven element including a one-way device interposed therein and operative therewith to permit backward rotation and to prevent forward rotation of said second turbine relative to said first turbine.

37. The combination defined in claim 32 in which said reaction structure means includes: a reaction shaft and a one-way device arranged to connect said second stator with said stationary support structure and to therewith prevent backward rotation and permit forward rotation of said second stator; and, a one-way device adapted to prevent backward rotation and to permit forward rotation of said first stator relative to said reaction shaft.

38. In a hydrodynamic torque converter drive having bladed-members, one pump, one stator, and two turbines, arranged in spaced relationship in a toroidal circuit for fluid recirculation, the combination comprising: a pump situated with its entrance in the inner half and its exit in the outer half of said circuit, and means to connect said pump to an input power structure; a stator situated in the inner half of said circuit with an interrupted space between its exit and said pump entrance, and reaction structure means to associate said stator with a stationary support structure to therewith render said stator firm against backward rotation; a first turbine situated with its entrance adjacent to said pump exit and its exit adjacent to the entrance of said stator; a second turbine having an array of blades interposed between said stator exit and said pump entrance; driven structure means to associate said turbines with an output power shaft to therewith afford, for each of said turbines, restraint of forward rotation for the conversion and transmission of energy to said output shaft, said driven structure means pertinent to said second turbine being thus operative in an early phase of the torque conversion range to enable said second turbine blades to vectorially reduce the moment of momentum of circulating fluid; and, restrictive influence means for said second turbine operative in a late phase of the torque conversion range to render said second turbine blades backwardly yieldable to circulating fluid and thus ineffective to vectorially increase the moment of momentum thereof while said first turbine remains effective to vectorially reduce the moment of momentum of said fluid.

39. The combination defined in claim 38 in which said restrictive influence means and said driven structure means pertinent to said second turbine include a driven element extending from a core element of said second turbine to a core element of said first turbine, said driven element including a one-way device interposed therein and operative therewith to permit backward rotation and to prevent forward rotation of said second turbine relative to said first turbine.

40. The combination defined in claim 38 in which: said restrictive influence means and said driven structure means pertinent to said second turbine include a driven element extending from a core element of said second turbine to a core element of said first turbine, said driven element including a one-way device interposed therein and operative therewith to permit backward rotation and to prevent forward rotation of said second turbine relative to said first turbine; and, the features of said second turbine include the relationship of the design radius at its exit being larger than the design radius at its entrance.

41. The combination defined in claim 38 in which said reaction structure means includes one-way device means to permit forward rotation operative to render said stator ineffective to vectorially reduce the moment of momentum of circulating fluid.

42. The combination defined in claim 38 in which: said reaction structure means includes one-way device means to permit forward rotation operative to render said stator ineffective to vectorially reduce the moment of momentum of circulating fluid; and, said restrictive influence means and said driven structure means pertinent to said second turbine include a driven element extending from a core element of said second turbine to a core element of said first turbine, said driven element including a one-way device interposed therein and operative therewith to permit backward rotation and to prevent forward rotation of said second turbine relative to said first turbine.

43. The combination defined in claim 38 in which said reaction structure means includes a reaction shaft and a one-way device arranged to connect said stator with said stationary support structure and to therewith prevent backward rotation and permit forword rotation of said stator.

References Cited in the file of this patent

UNITED STATES PATENTS

| | | |
|---|---|---|
| 1,760,480 | Coats | May 27, 1930 |
| 1,953,458 | Bauer et al. | Apr. 23, 1934 |
| 1,965,518 | Wilson | July 3, 1934 |
| 2,152,113 | Van Lammerin | Mar. 28, 1939 |
| 2,173,604 | Dodge | Sept. 19, 1939 |
| 2,190,830 | Dodge | Feb. 20, 1940 |

(Other references on following page)

UNITED STATES PATENTS

| | | |
|---|---|---|
| 2,196,585 | Gette | Apr. 9, 1940 |
| 2,235,673 | Dodge | Mar. 18, 1941 |
| 2,258,684 | Lysholm et al. | Oct. 4, 1941 |
| 2,271,919 | Jandasek | Feb. 3, 1942 |
| 2,293,767 | Salerni | Aug. 25, 1942 |
| 2,313,645 | Jandasek | Mar. 9, 1943 |
| 2,365,879 | Jandasek | Dec. 26, 1944 |
| 2,388,329 | Jandasek | Nov. 6, 1945 |
| 2,440,445 | Jandasek | Apr. 27, 1948 |
| 2,453,795 | Jandasek | Nov. 16, 1948 |

FOREIGN PATENTS

| | | |
|---|---|---|
| 259,916 | Switzerland | July 1, 1949 |